United States Patent
Jenzeh et al.

(10) Patent No.: US 10,412,232 B2
(45) Date of Patent: Sep. 10, 2019

(54) CONVERGED FAMILY NETWORK USAGE INSIGHTS AND ACTIONS

(71) Applicant: Verizon Patent and Licensing Inc., Arlington, VA (US)

(72) Inventors: Lisa Jenzeh, Wayland, MA (US); Ahmed A. Bham, Lilburn, GA (US); Kurt Myers, Valhalla, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 248 days.

(21) Appl. No.: 14/718,592

(22) Filed: May 21, 2015

(65) Prior Publication Data
US 2016/0344873 A1  Nov. 24, 2016

(51) Int. Cl.
G06F 15/173 (2006.01)
H04M 15/00 (2006.01)
H04L 12/14 (2006.01)
H04B 10/079 (2013.01)

(52) U.S. Cl.
CPC ...... H04M 15/866 (2013.01); H04B 10/0793 (2013.01); H04L 12/1414 (2013.01); H04L 12/1457 (2013.01); H04L 12/1471 (2013.01); H04M 15/7652 (2013.01); H04M 15/887 (2013.01); H04L 12/1439 (2013.01)

(58) Field of Classification Search
CPC ....... H04L 41/24; H04L 47/801; H04L 67/22; H04L 63/10; H04L 63/104; H04M 3/38; H04M 3/54; H04M 1/66; G06F 21/6218; H04W 4/02; G06Q 10/10; G06Q 10/103; G06Q 20/10; H04N 7/163

USPC ................. 709/224; 455/410, 445
See application file for complete search history.

(56) References Cited

U.S. PATENT DOCUMENTS

| | | | | |
|---|---|---|---|---|
| 7,640,336 | B1 * | 12/2009 | Lu | G06Q 10/10 709/206 |
| 7,664,083 | B1 * | 2/2010 | Cermak | H04L 67/22 370/338 |
| 8,843,953 | B1 * | 9/2014 | Dang | H04N 21/44204 725/28 |
| 9,172,705 | B1 * | 10/2015 | Kong | H04L 47/801 |
| 2004/0158630 | A1 * | 8/2004 | Chang | H04L 41/24 709/224 |
| 2005/0010483 | A1 * | 1/2005 | Ling | G06Q 20/10 705/39 |

(Continued)

*Primary Examiner* — Dustin Nguyen

(57) ABSTRACT

A system receives, from an account holder, a customized selection of notification methods and notification conditions associated with notifying an account holder about a first family member's network activity, wherein the first family member's network activity includes a first device's activity in a first network and a second device's activity in a second network, and wherein the second network is a different network than the first network. The system monitors multiple first types of network activity of the first device in the first network, and monitors multiple second types of network activity of the second device in the second network. The system provides notifications to the account holder based on the customized selection of notification methods and notification conditions and based on the monitored first types of the network activity of the first device and the monitored second types of the network activity of the second device.

20 Claims, 29 Drawing Sheets

(56) References Cited

U.S. PATENT DOCUMENTS

| | | | | |
|---|---|---|---|---|
| 2005/0240959 | A1* | 10/2005 | Kuhn | H04N 7/163 |
| | | | | 725/25 |
| 2006/0293057 | A1* | 12/2006 | Mazerski | H04M 3/38 |
| | | | | 455/445 |
| 2009/0033515 | A1* | 2/2009 | Cavanaugh | H04W 4/02 |
| | | | | 340/8.1 |
| 2009/0197569 | A1* | 8/2009 | Gaznaghi | H04M 3/54 |
| | | | | 455/410 |
| 2010/0146607 | A1* | 6/2010 | Piepenbrink | G06F 21/6218 |
| | | | | 726/7 |
| 2011/0185437 | A1* | 7/2011 | Tran | H04L 63/104 |
| | | | | 726/28 |
| 2013/0017806 | A1* | 1/2013 | Sprigg | H04M 1/66 |
| | | | | 455/411 |
| 2014/0038546 | A1* | 2/2014 | Neal | G06Q 10/103 |
| | | | | 455/405 |
| 2015/0256545 | A1* | 9/2015 | Dotterer, III | H04L 63/10 |
| | | | | 726/1 |

* cited by examiner

CONVERGED FAMILY NETWORK USAGE INSIGHTS AND ACTIONS

BACKGROUND

Cellular networks are now so ubiquitous that wireless connectivity, either via voice or data connection, is available in most regions throughout the U.S. In conjunction with the rise of cellular network coverage and reliability has been the increasing sophistication and power of cellular telephones. Cellular telephones have become devices that, in addition to permitting voice calls, texting, and Internet surfing, also have the capability to download and execute applications having functionality that can nearly rival the performance of full-size computers.

Cable television has become a common method of receiving television content—effectively displacing broadcast television in many residential areas. Cable networks provide cable TV programming, Internet connectivity, and Voice over Internet Protocol (VoIP) phone service to homes within the reach of the cable networks. As one example of a "cable network," Verizon currently offers their "FiOS"™ service, which provides bundled Internet access, VoIP telephone, and television service over a fiber-optic communications network in certain geographic regions in the U.S. At residential locations, Verizon FiOS™ service may be offered in conjunction with a broadband home router that includes "Wi-Fi" capability, for enabling wired Internet access via the router and wireless Internet access via a "Wi-Fi" wireless home network provided by the router.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

As described herein, a converged network activity monitoring service, for monitoring the network activity of family members and controlling the family members' network access and network usage, is implemented across multiple different networks. For example, the multiple different networks may include a cellular network, and a fiber optic communications network. The converged network activity monitoring service may receive customized parameters from an account holder for customizing the network activity monitoring of the account holder's family members and for customizing the family members' network access and network usage.

Figure 1:
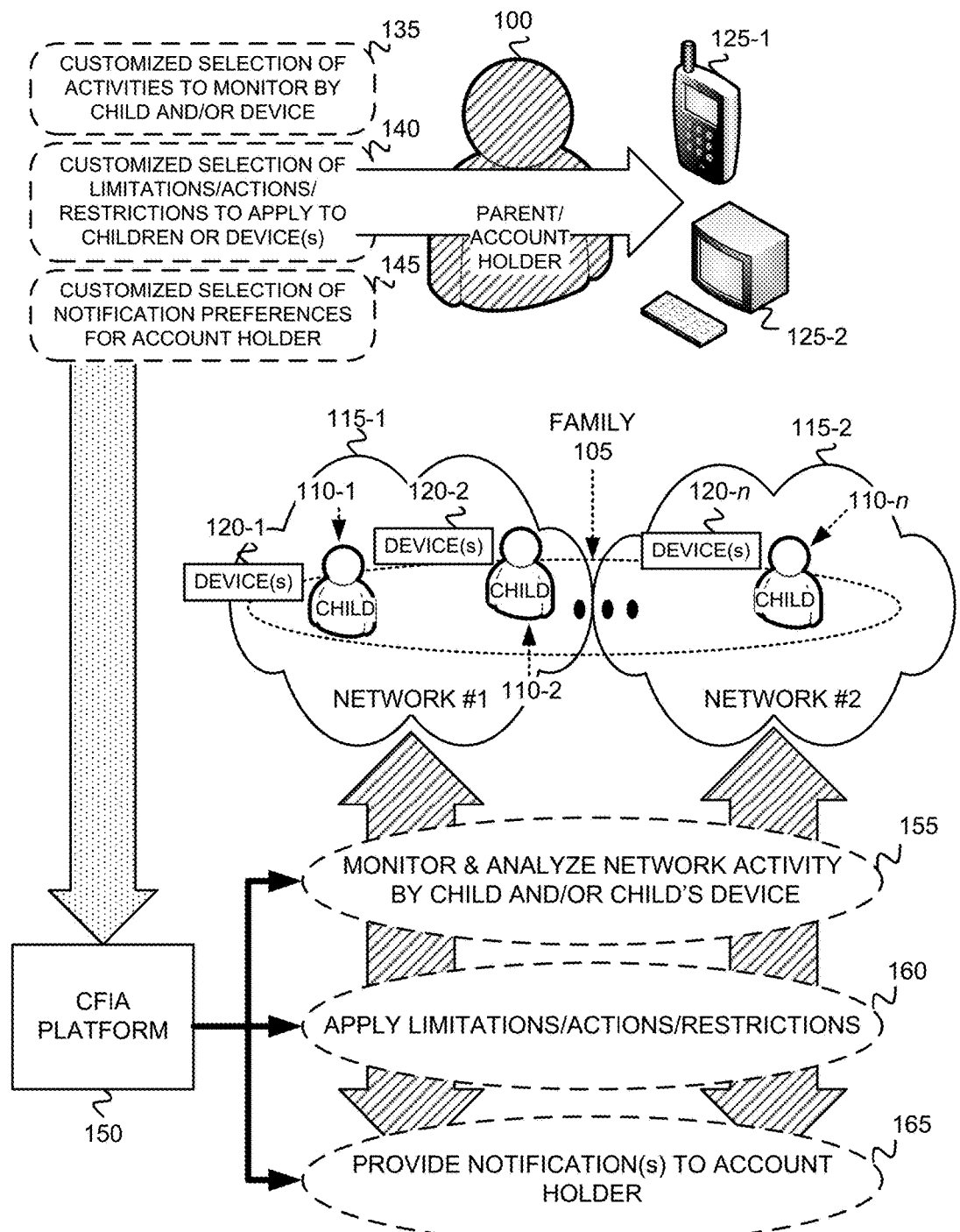
FIG. 1 depicts an overview of an account holder of a network service performing a customized selection of parameters related to the monitoring of network activity, across multiple different networks, of children of the account holder.

FIG. 1 depicts an overview of an account holder 100 of a network service performing a customized selection of parameters related to the monitoring of network activity, across multiple different networks, of family members (e.g., children) of the account holder. Account holder 100 may wish to monitor the network activity of members of the account holder's family 105, including children 110-1 through 110-n (where n is an integer greater than or equal to 1), while the members of family 105 use different types of devices that connect to, and are active via, multiple different networks. For purposes of simplicity, two different networks 115-1 and 115-2 are shown in FIG. 1, though three or more different networks may be used by family members 105. Each child 110-1 through 110-n of family 105 may use one or more respective devices. As shown in FIG. 1, child 110-1 uses device(s) 120-1, child 110-2 uses device(s) 120-2 and child 110-n uses device(s) 120-n.

Account holder 100 may use a network device, such as a cellular "smart" phone 125-1 or a computer 125-2 (e.g., desktop, laptop, tablet computer) and an application (app), a web browser or other type of computer program installed at the network device, for receiving account holder 100 input and for providing a customized selection of parameters related to the monitoring of network activity, across multiple different networks 115-1 and 115-2, of children 110-1 through 110-n.

The customized selection of parameters may include a customized selection of activities to monitor 135 by child 110 of family 105 and/or by child's device 120. A comprehensive list of activities may be provided to account holder 100 for selection, per network, per child and/or per device.

Account holder 100 may select the specific ones from the list of activities that account holder 100 desires to have monitored and analyzed. The activities that account holder 100 chooses from may include time/date usage by device and/or associated child per day, where the usage may include data or time usage totals or summaries per day. The activities may further include billable data usage (e.g., in a cellular network), billable time usage (e.g., in a cellular network), sites visited, applications accessed, content or television programming accessed, and/or attempts to access blocked or flagged sites/content. Other types of network activity, not described here, may be monitored and analyzed.

The customized selection of parameters may further include a customized selection of limitations, actions and/or restrictions 140 to apply to any of children 110-1 through 110-n or to any of devices 120-1 through 120-n. A comprehensive list of limitations, actions and/or restrictions may be provided to account holder 100 to be applied per network, per child and/or per device. Account holder 100 may select the specific limitations, actions and restrictions that account holder 100 desires to have applied based on the monitoring and analysis of network activity in the multiple different networks. The limitations, actions and restrictions may include specific limitations, actions or restrictions to apply to specified children or devices based on monitored network activity of those children or devices. For example, the list of limitations, actions or restrictions may include TV viewing locks, On-Demand viewing locks, time of day/week content or device restrictions, content filtering by age, group and/or category, data/Internet connectivity restrictions or locks, text restrictions or locks, and call restrictions or locks. Other types of limitations, actions or restrictions, not described here, may be selected by account holder 100 for application to children 110-1 through 110-n and/or devices 120-1 through 120-n.

The customized selection of parameters may also include a customized selection of notification preferences 145 for account holder 100. The notification preferences 145 may include a selection of notification methods and notification conditions for providing notifications to account holder 100. A comprehensive list of notification preferences, including various different notification methods and notification conditions that may be selected per network, per child and/or per device, may be presented to account holder 100, and account holder 100 may select the specific notification preferences that account holder 100 desires to have applied based on the monitoring and analysis of network activity in the multiple different networks. The notification methods may include automatic push-type notifications, such as email, text, or app push notification, or pull-type notifications such as web portal notifications (requiring account holder 100 log-in to the web portal). The notification conditions that trigger notifications may include activity during certain hours, new network devices being added or detected, and/or attempts to access blocked or flagged content. The notification conditions may additionally include specified thresholds associated with network activity selected for monitoring, such as exceeding a certain time limit during child phone usage, exceeding a time limit web browsing or playing computer games, etc.

Account holder 100 may provide the customized selection of parameters (135, 140 and 145) to a Converged Family Insights and Actions (CFIA) platform 150 via phone 125-1 or computer 125-2. CFIA platform 150 may include one or more network devices (e.g., servers, computers, etc.) that store the customized selection of parameters received from account holder 100, and which monitor and analyze the network activity of account holder 100's family 105 within the multiple different networks (e.g., networks 115-1 and 115-2).

CFIA platform 150 may, based on the stored customized parameters, monitor and analyze network activity 155 of members of family 105, where the monitoring is performed per child 110 (i.e., over all devices used by that child) or per specific device of each child 110. CFIA platform 150 may retrieve the previously stored customized parameters and, based on the performed monitoring and analysis, may apply 160 limitations, actions or restrictions to one or more of children 110-1 through 110-n, or to one or more device(s) 120 associated with children 110-1 through 110-n. CFIA platform 150 may also retrieve the previously stored customized notification preferences and, based on the performing monitoring and analysis, may provide 165 a notification(s) to account holder 100 as directed by the notification method(s) and notification condition(s) specified in the notification preferences.

Figure 2:
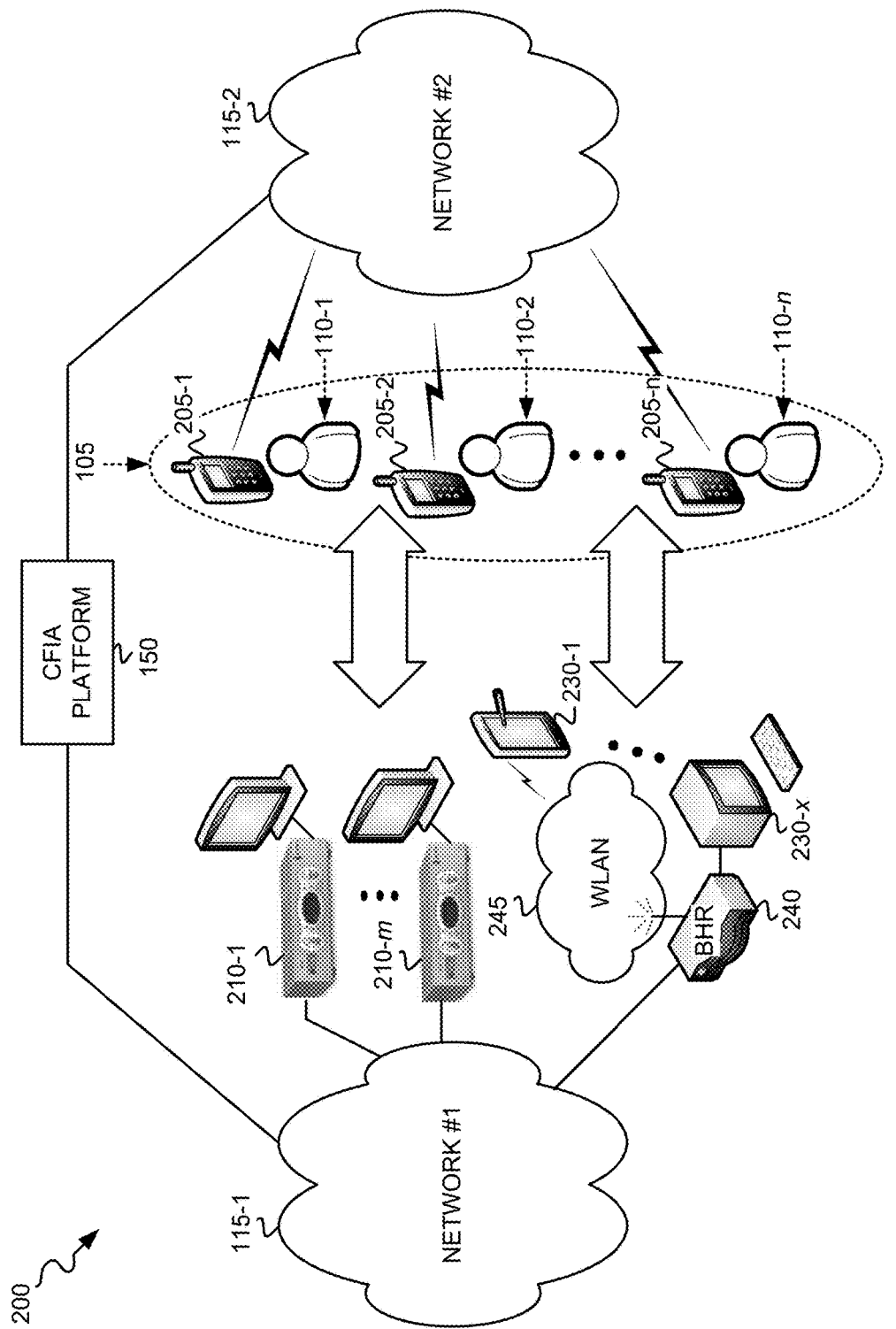
FIG. 2 depicts an exemplary network environment in which the platform of FIG. 1 may monitor and analyze network activity of members of a family in multiple different networks.

FIG. 2 depicts an exemplary network environment 200 in which CFIA platform 150 may monitor and analyze network activity of members of family 105 in multiple different networks. Network environment 200 may include CFIA platform 150 connected to the multiple different networks, including networks 115-1 and 115-2 shown in FIG. 2. Members of family 105 may have access to, and use, set-top boxes (STBs) 210-1 through 210-m, and other computational devices 230-1 through 230-x, which connect, either directly or indirectly, with network 115-1. Network 115-1 may include any type of home delivery network that provides network service(s) to residential homes (and commercial properties) and in which functionality is introduced that enables the monitoring (155 in FIG. 1) of network activity by specific devices or child devices, and/or which further includes functionality for applying limitations, actions and/or restrictions (160 in FIG. 1) to specific devices or child devices. For example, in one implementation network 115-1 may include a fiber optic communications network (e.g., Verizon's FiOS™ network) that provides TV programming and/or Internet connectivity to STBs 210-1 through 210-m and/or computational devices 230-1 through 230-x at residential homes (and commercial properties). FIG. 2 depicts STBs 210 and computational devices 230 associated with a single home and a single family 105. Network 115-1 may, however, deliver network service(s) to multiple different homes and families Network 115-1 may further connect to the Internet and/or to other networks (not shown). Each of STBs 210-1 through 210-m may receive content, via one or more channels (e.g., Quadrature Amplitude Module (QAM) channels, Internet Protocol (IP) streams, etc.) over network 115-1 from one or more content providers (not shown), and may supply the content to a display device. The content may include, for example, text, images, audio, video content and/or television (TV) video programs. The display device may include a device having audio, video and image displaying capabilities. The display device may include, for example, a TV or monitor.

Each of STBs 210-1 through 210-m, computational devices 230-1 through 230-x, and a broadband home router (BHR) 240 may reside at a home residence associated with family 105. BHR 240 may connect to network 115-1 and serve as a router device for providing Internet connectivity. BHR 240 may further, as shown in FIG. 2, include "Wi-Fi" capability that implements a wireless local area network (WLAN) 245 based on, for example, the IEEE 802.11 standards. Using WLAN 245 and network 115-1, computational devices 230-1 through 230-x may connect with the Internet. Computational devices 230-1 through 230-x may each include any type of device that performs digital computations and which has WLAN capability, such as, for example, a computer (desktop, laptop, palmtop, or tablet computer), a gaming device (e.g., Xbox or Playstation), a media playing device, a camera, or a video-camera.

Family 105 may include multiple family members, including parent/account holder 100 (not shown in FIG. 2), and children 110-1 through 110-n. Each child 110-1 through 110-n may be associated with a respective mobile device 205-1 through 205-n (generically and individually referred to herein as "mobile device 205"). Mobile device 205 may include a portable electronic device, having wireless communication capabilities, that may communicate with network 115-2 and/or WLAN 245. Mobile device 205 may include, for example, a laptop, palmtop or tablet computer having wireless capability; a cellular telephone (e.g., a "smart" phone); or a personal digital assistant (PDA) having wireless capability. Mobile device 205 may be carried and operated by a child 110. Child 110 may use mobile device 205 to make voice calls via network 115-2, to connect to the Internet via network 115-2 (e.g., to web-surf, download apps, etc.), to connect to the Internet via WLAN 245 and network 115-1, and/or to execute apps to perform various functions.

Network 115-2 may include a Public Land Mobile Network (PLMN) that may connect to other networks, such as, for example, the Internet. The PLMN enables voice calls and data transfer between mobile devices 205-1 through 205-n and other devices, such as other devices (e.g., web servers) connected to the Internet. The PLMN may include any type of PLMN, such as, for example, a Code Division Multiple Access (CDMA) 2000 PLMN, a Global System for Mobile Communications (GSM) PLMN, a Long Term Evolution (LTE) PLMN or other types of PLMNs.

The configuration of network components of network environment 200 illustrated in FIG. 2 is for illustrative purposes. Other configurations may be implemented. Therefore, network environment 200 may include additional, fewer and/or different components that may be configured in a different arrangement than that depicted in FIG. 2. For example, network environment 200 may include any number of families 105, associated children 110, mobile devices 110, STBs 210, BHRs 240, and/or computational devices 230. STBs 210-1 through 210-m, computational devices 230-1 through 230-x, and mobile devices 205-1 through 205-n, as shown in FIG. 2, may correspond to the device(s) 120-1 through 120-n depicted in FIG. 1.

Figure 3A:
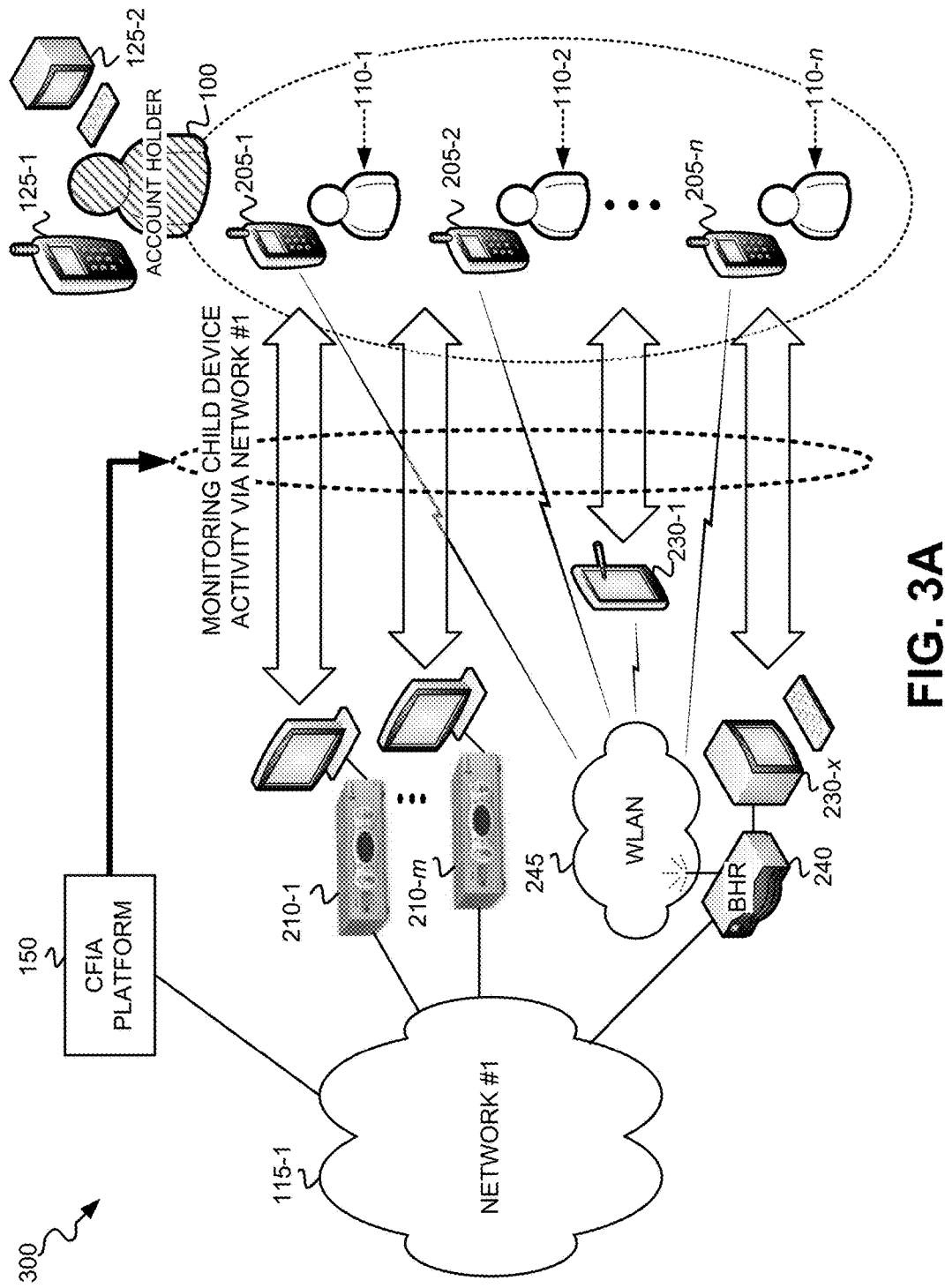
FIG. 3A depicts a portion of the network environment of FIG. 2, where a parent/account holder uses a "smart" phone or computer to send customized selections of child/device activity to monitor and analyze in network #1 to the platform of FIG. 1.

FIG. 3A depicts a portion 300 of network environment 200 of FIG. 2, where parent/account holder 100 uses "smart" phone 125-1 or computer 125-2 to send customized selections of child/device activity to monitor and analyze, in network 115-1, to CFIA platform 150. The customized selections of child/device activity may be specific to one or more particular children 110-1 through 110-n, and/or specific to one or more particular devices, including mobile devices 205-1 through 205-n (e.g., via WLAN 245 and "Wi-Fi"), STBs 210-1 through 210-m, and computational devices 230-1 through 230-x. The customized selections of child/device activity may also be specific, or particular, to network 115-1, or to both networks 115-1 and 115-2 (not shown in FIG. 3A) together. As shown in FIG. 3A, CFIA platform 150 may monitor child device activity via network 115-1, as specified by the customized selections of account holder 100.

Figure 3B:
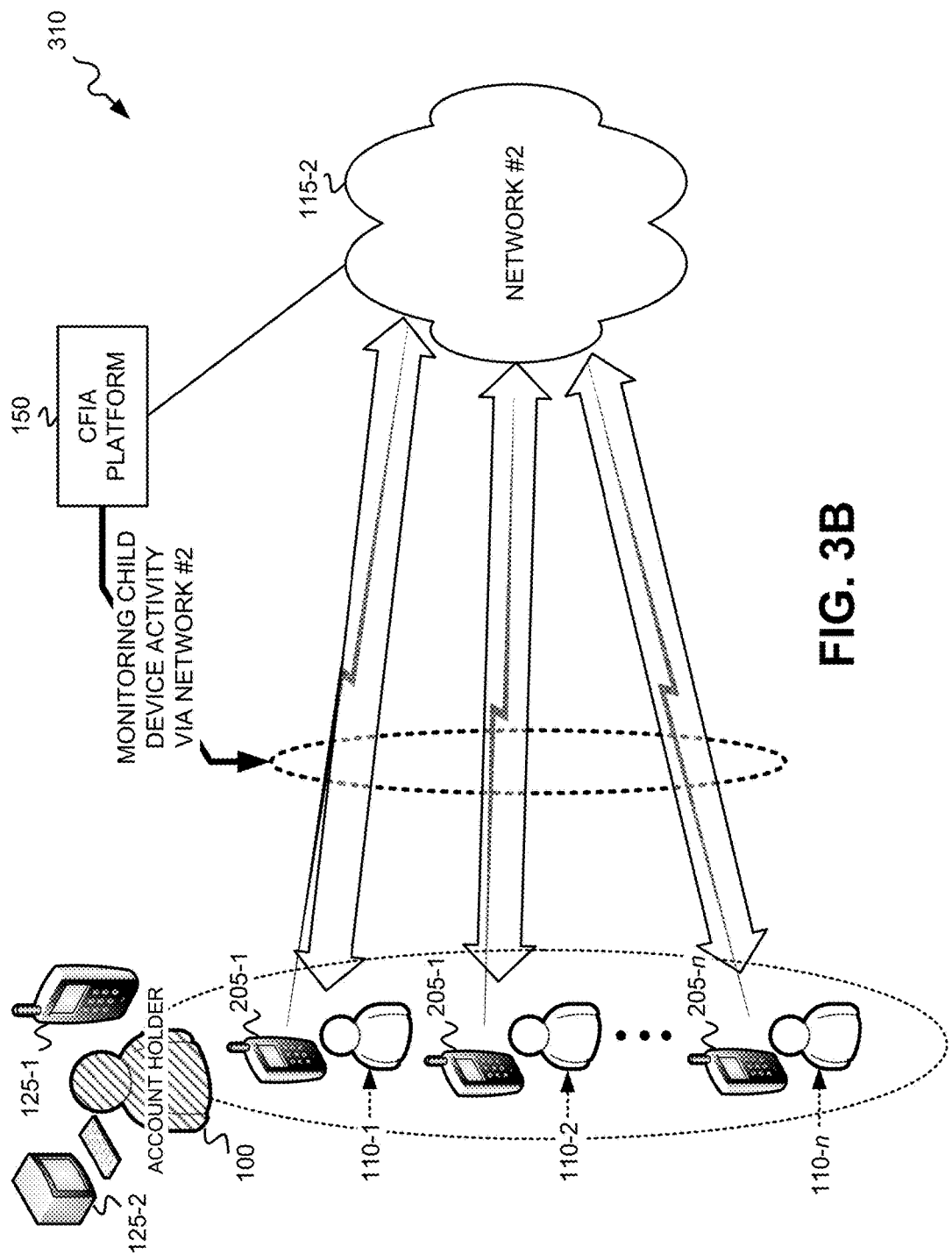
FIG. 3B depicts another portion of the network environment of FIG. 2, where the parent/account holder uses a "smart" phone or computer to send customized selections of child/device activity to monitor and analyze in network #2 to the platform of FIG. 1.

FIG. 3B depicts another portion 310 of network environment 200 of FIG. 2, where parent/account holder 100 uses "smart" phone 125-1 or computer 125-2, to send customized selections of child/device activity to monitor and analyze, in network 115-2, to CFIA platform 150. The customized selections of child/device activity may be specific to one or more particular children 110-1 through 110-n, and/or specific to one or more particular devices, including mobile devices 205-1 through 205-n (e.g., via network 115-2). The customized selections of child/device activity may also be specific, or particular, to only network 115-1 (not shown FIG. 3B), to only network 115-2, or to both networks 115-1 and 115-2 together. As shown in FIG. 3B, CFIA platform 150 may monitor child device activity via network 115-2, as specified by the customized selections of account holder 100.

Figure 4:
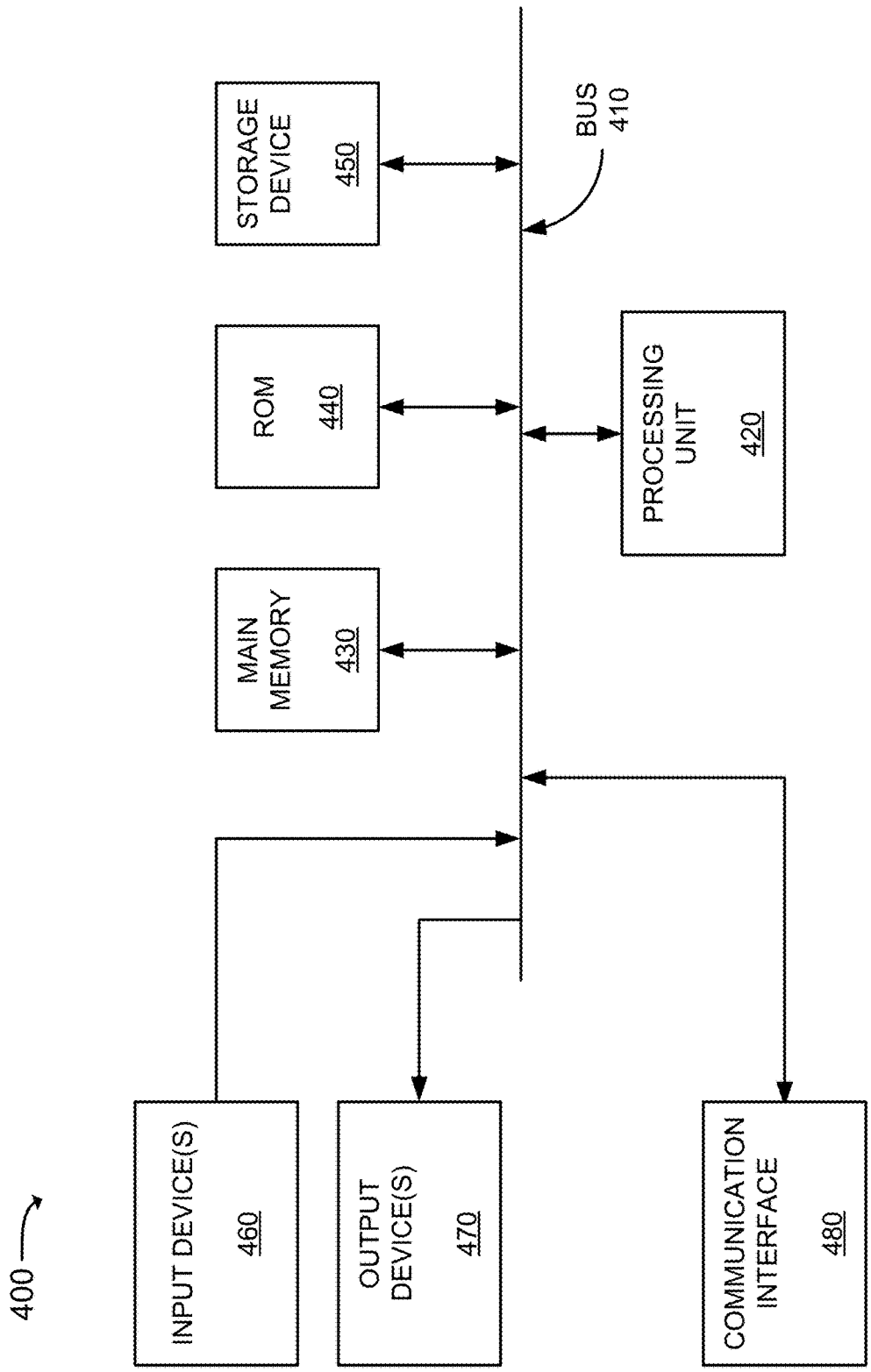
FIG. 4 is a diagram that depicts exemplary components of a device that may correspond to the platform, computational device, and/or mobile device of FIG. 2.

FIG. 4 is a diagram that depicts exemplary components of a device 400. CFIA platform 150, STBs 210, computational devices 230, and mobile devices 205 may each have the same or similar components in a same or similar configuration to that shown in FIG. 4. Device 400 may include a bus 410, a processing unit 420, a main memory 430, a read only memory (ROM) 440, a storage device 450, an input device(s) 460, an output device(s) 470, and a communication interface(s) 480. Bus 410 may include a path that permits communication among the elements of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium."

Input device 460 may include one or more mechanisms that permit an operator (or user) to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface(s) 480 may include a transceiver that enables device 400 to communicate with other devices and/or systems. For example, communication interface(s) 480 may include wired or wireless transceivers for communicating via networks 115-1 and/or 115-2. Communication interface(s) 480 may include a cellular network transceiver, a BlueTooth transceiver, and/or a Wi-Fi transceiver. For example, mobile device 205 may include both a cellular network transceiver, for communicating via network 115-2, and a Wi-Fi transceiver for communicating via WLAN 245.

The configuration of components of device 400 illustrated in FIG. 4 is for illustrative purposes only. Other configurations may be implemented. Therefore, device 400 may include additional, fewer and/or different components, or differently arranged components, than those depicted in FIG. 4.

Figure 5:
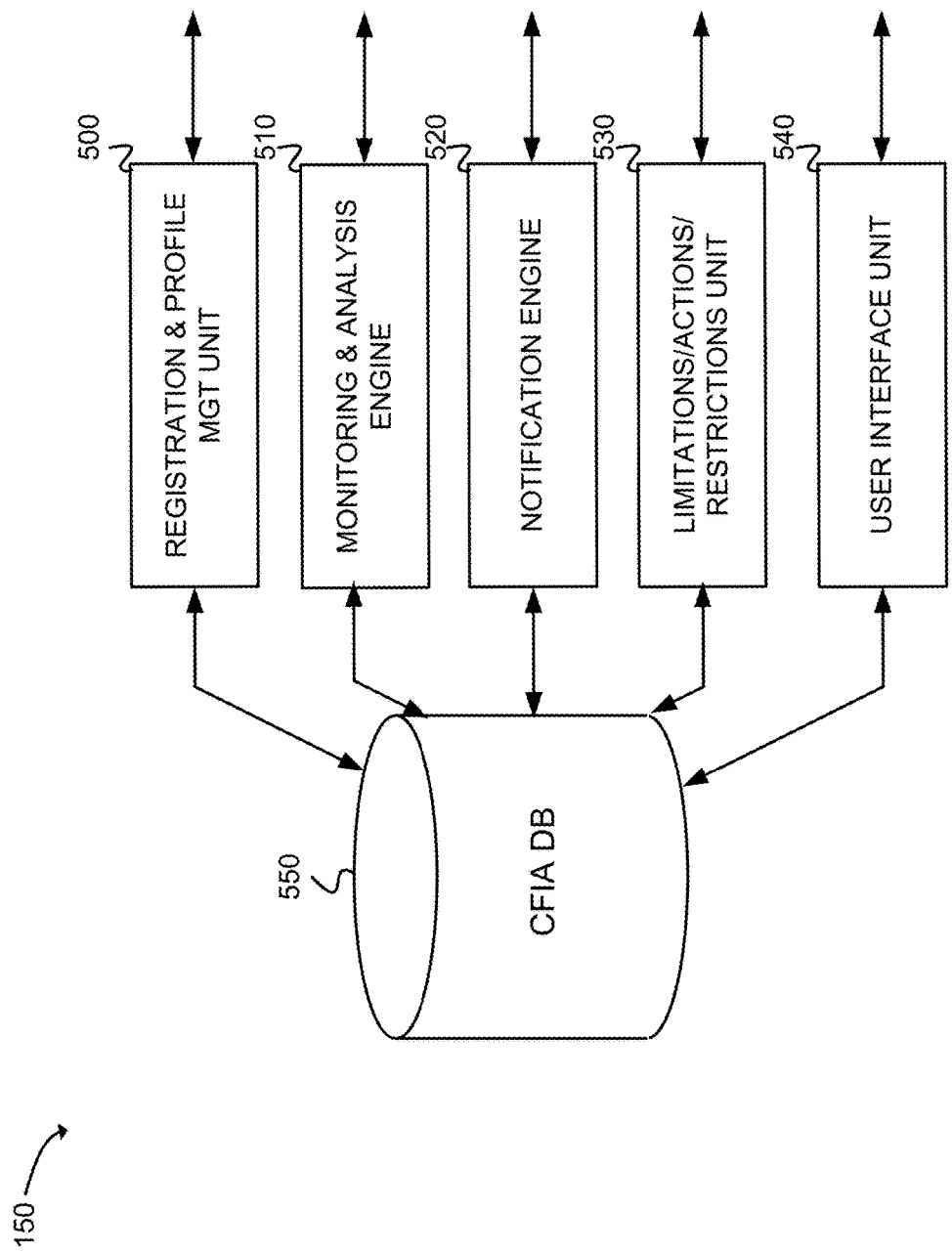
FIG. 5 depicts exemplary functional components of the platform of FIG. 1.

FIG. 5 depicts exemplary functional components of CFIA platform 150. The functional components shown in FIG. 5 may each be implemented by one or more components depicted in FIG. 4. CFIA platform 150 may include a registration and profile management (Mgt) unit 500, a monitoring and analysis engine 510, a notification engine 520, a limitations/actions/restrictions unit 530, a user interface unit 540, and a CFIA database (DB) 550.

Registration and profile Mgt unit 500 receives and stores account holder registrations, authentication information, and child identification and associated device(s) information. Unit 500 stores the information in an account holder profile (described with respect to FIG. 6 below) in CFIA DB 550.

Monitoring & analysis engine 510 performs the monitoring of family member network activity in multiple networks, such as networks 115-1 and 115-2, and further may perform an analysis of the monitored network activity, including analyzing trends in activity for children or child devices.

Notification engine 520 retrieves the customized notification preferences stored in an account holder profile of CFIA DB 550, and provides notifications to account holder 100 based on the notification conditions and notification methods specified in the notification preferences.

Limitations/actions/restrictions unit 530 retrieves the customized selections of limitations, actions and/or restrictions stored in the account holder profile of CFIA DB 550 and exercises control over the network access and/or network usage of certain children and/or child devices by executing the customized selections of limitations, actions and/or restrictions.

User interface unit 540 may enable account holder 100 to interact with CFIA platform 150, including providing notification preferences, etc. For example, if account holder 100 accesses CFIA platform 150 via computer 125-2 and a web browser, user interface unit 540 may provide the web pages (e.g., hypertext markup language (HTML)) that enable account holder 105 to enter and supply data. As another example, if account holder 100 accesses CFIA platform 150 via cellular "smart" phone 125-1 and an app, user interface unit 540 may interface with the app executing at smart phone 125-1 to enable account holder 105 to enter and supply data.

CFIA DB 550 stores an account holder profile, described with respect to FIG. 6 below, for each account holder of the converged network activity monitoring and control service described herein. CFIA DB 550 may be stored in, for example, memory 430 or storage device 450. Each of units 500, 530 and 540, and engines 510 and 520, may store and retrieve data from particular account holder profiles of CFIA DB 550.

The configuration of functional components of CFIA platform 150 illustrated in FIG. 5 is for illustrative purposes only. Other configurations may be implemented. Therefore, CFIA platform 150 may include additional, fewer and/or different components, or differently arranged components, than those depicted in FIG. 5.

Figure 6:
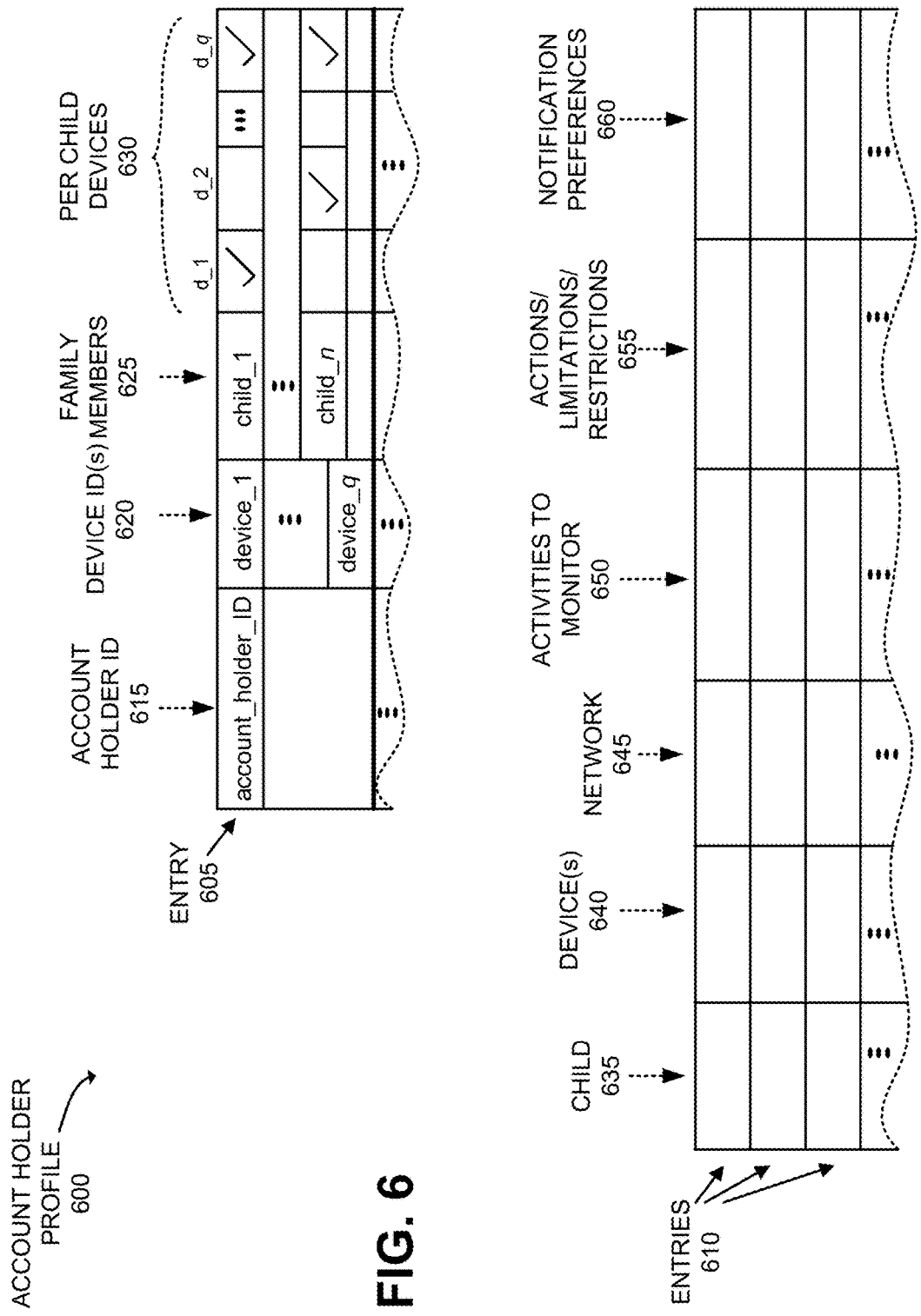
FIG. 6 is a diagram that depicts an exemplary data structure, associated with an account holder profile that may be stored in the database of FIG. 5.

FIG. 6 is a diagram that depicts an exemplary data structure, associated with an account holder profile 600, that may be stored in CFIA DB 550. Account holder profile 600 may include an entry 605 and multiple linked entries 610. Entry 605 of account holder profile 600 may include an account holder identifier (ID) field 615, a device ID(s) field 620, a family members field 625, and multiple per child devices fields 630. Though only a single account holder profile 600 is depicted in FIG. 6 for purposes of simplicity, CFIA DB 550 may store n different account holder profiles 600, where n is an integer greater than or equal to one and where n equates to the total number of different account holders that have an account holder profile 600 stored in CFIA DB 550.

Account holder ID field 615 stores a unique identifier associated with a particular account holder. The contents of field 615 may be used as an index to retrieve data from, or store data in, fields 620, 625, 630 and all of the fields of entries 610 that are linked to entry 605. Entries 610, shown in the bottom half of FIG. 6, are linked to entry 605 shown in the top half of FIG. 6. Other data associated with the account holder's account may be stored in field 605, such as, for example, the account holder's email address, phone number and home address.

Device ID(s) field 620 stores unique identifiers of devices associated with the account holder's account. Device ID(s) field 620 may store multiple (q) fields for each device, including child devices, associated with the account holder's account. Family members field 625 stores identifiers (e.g., family member names) associated with each of the account holder's family members, including the account holder's n children. Per child devices field 630 stores a flag bit for each of the devices identified in field 620 and for each family member stored in field 625. For example, as shown in FIG. 6, if the flags are set for devices d_1 and d_q for child_1, then child_1 has been identified by the account holder as using devices d_1 and d_q. Another example, as shown in FIG. 6, depicts the flags being set for devices d_2 and d_q for child_n, indicating that account holder has identified child_n as being a user of devices d_2 and d_q. In this example of FIG. 6, device d_q represents a "shared network device" that is used by more than one family member.

Each of entries 610 of account holder profile 600 includes a child field 635, a device(s) field 640, a network field 645, an "activities to monitor" field 650, an "actions/limitations/restrictions" field 655, and a notification preferences field 660. All of entries 610 of FIG. 6 are linked to entry 605 in account holder profile 600. Therefore, accessing entry 605 further links the access to multiple entries 610, where each of the multiple entries 610 stores data related to a particular child of the account holder.

Child field 635 stores a unique identifier (e.g., the particular child's name) for each of the account holder's children identified in family members field 625. Device(s) field 640 stores device identifiers associated with one or more devices used by the child identified in child field 635, and to which the activity to monitor stored in field 650, the actions/limitations/restrictions stored in field 655, and the notification preferences stored in field 660 are to be applied. Network field 645 stored an identifier of the network or networks to which the device or devices identified in field 640 connect, and in which network activity is to be monitored. "Activities to monitor" field 650 stores data indicating the network activities for the child identified in field 635, and the corresponding child device(s) identified in field 640, that are to be monitored and analyzed. "Actions/limitations/restrictions" field 655 stores data indicating the actions, limitations and/or restrictions that are to be applied to the child identified in field 635, and the corresponding child device(s) identified in field 640. Notification preferences field 660 stores data indicating the notification preferences for notifying account holder 100 of certain network activity of the child identified in field 635, when the child is using the corresponding child device(s) identified in field 640.

The number, types, and content of the entries and/or fields in the data structure of account holder profile 600 shown in FIG. 6 are for illustrative purposes. Other types of data structures having different numbers of, types of and/or content of, the entries and/or the fields may be implemented. Therefore, the data structure of account holder profile 600 may include additional, fewer and/or different entries and/or fields than those depicted in FIG. 6. For example, though a tabular data structure is shown in FIG. 6, other types of data structures may also be used.

Figure 7:
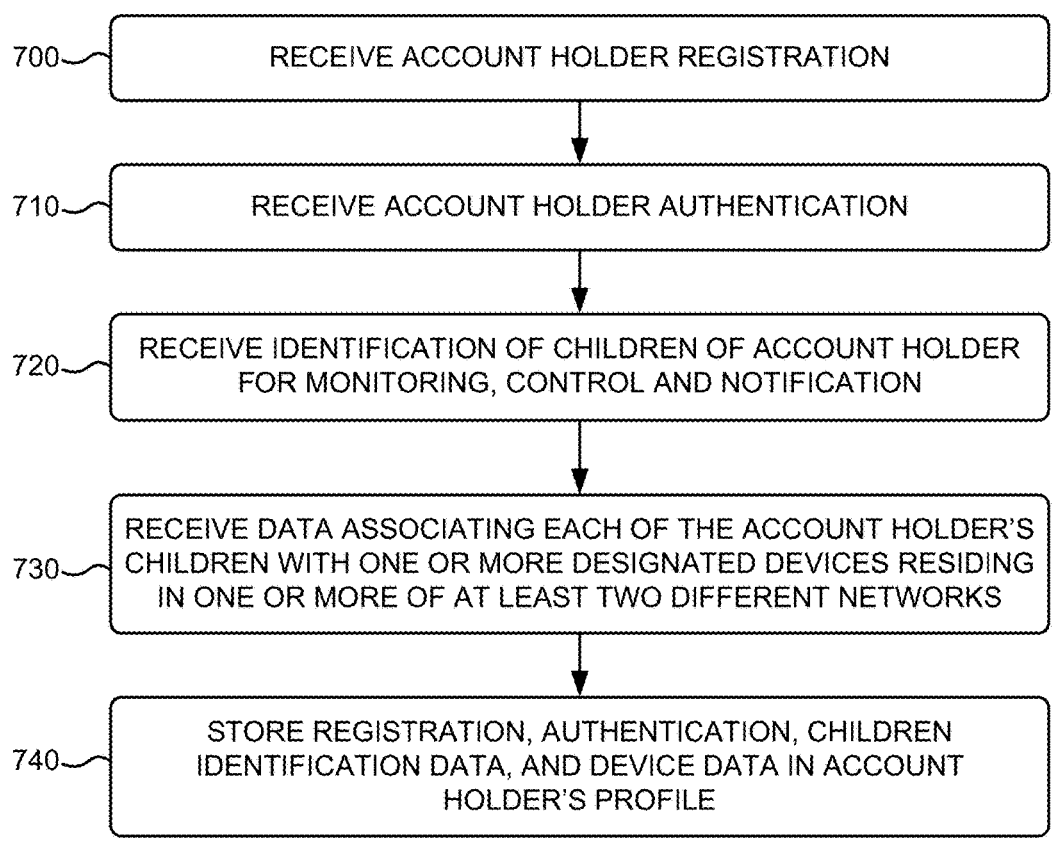
FIG. 7 is a flow diagram that illustrates an exemplary process for account holder registration and for associating children of the account holder with one or more devices resident in multiple different networks.

FIG. 7 is a flow diagram that illustrates an exemplary process for account holder registration and for associating children of the account holder with one or more devices resident in multiple different networks. The exemplary process of FIG. 7 may be implemented by CFIA platform 150. The exemplary process of FIG. 7 is described below with reference to FIGS. 8A, 8B, 9A, and 9B, and to previously described figures.

The exemplary process may include CFIA platform 150 receiving an account holder registration (block 700). Referring to FIG. 3A, account holder 100 may send account registration information via either phone 125-1 or computer 125-2 to CFIA platform 150. The account registration information may include, for example, an account holder ID, and an email address, a phone number, and a home address of the account holder. CFIA platform 150 receives an account holder authentication (block 710). Various different types of authentication may be used for authenticating the account holder. In one implementation, a user name and password combination may be used for authenticating the account holder. In another implementation, the user name and password combination, in conjunction with a digital certificate, or other type of signed or encrypted "token," may be used for account holder authentication. In other implementations, biometric authentication mechanisms may be used for account holder authentication.

Figure 8:
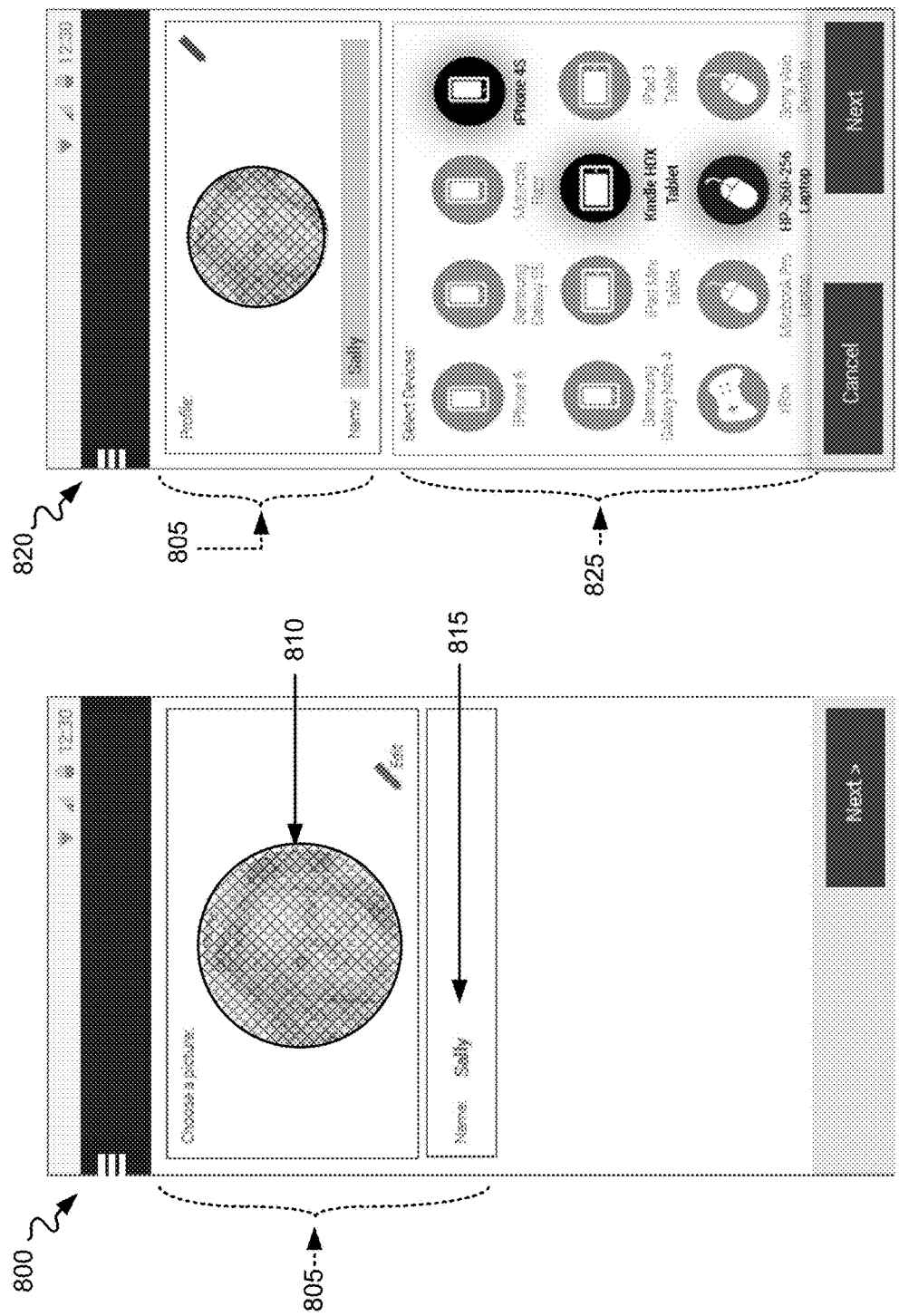
FIGS. 8A, 8B, 9A and 9B are diagrams depicting exemplary user interfaces associated with the process of FIG. 7.

CFIA platform 150 receives an identification of children of the account holder for monitoring, control and notification (block 720). CFIA platform 150 may receive an identification of the family members of the account holder, including the children of the account holder. The received identification of family members of the account holder may be stored in family members field 625 of an entry 605 of account holder profile 600. FIG. 8A depicts an exemplary mobile user interface (UI) 800 that may be used for identifying a family member (i.e., a child) of the account holder. The mobile UI 800 may be executed by, for example, account holder 100's phone 125-1. In the exemplary mobile UI 800, a child information section 805 of the UI may permit a picture, image or icon 810 associated with the child to be selected/entered, and identification information 815 (e.g., child name) to be selected/entered. Upon entry of the data in mobile UI 800, the device (e.g., phone 125-1) of the account holder may send the data to CFIA platform 150.

Figure 9:
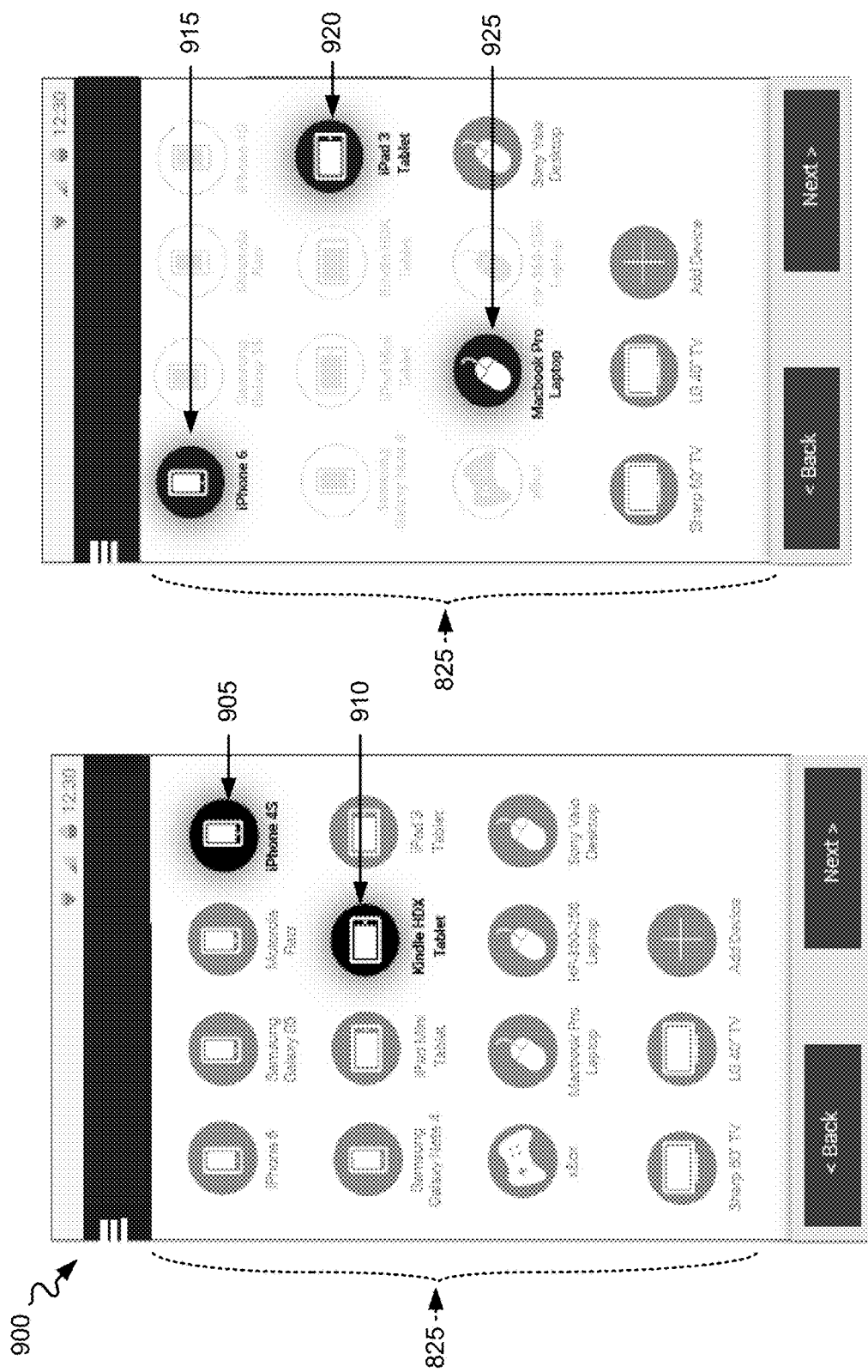

CFIA platform 150 receives data associating each of the account holder's children with one or more designated devices residing in one or more of at least two different networks, such as networks 115-1 and 115-2 (block 730). FIG. 8B depicts an exemplary mobile UI 820 that includes the child information section 805 of FIG. 8A, but additionally includes a device section 825 that displays multiple different devices, connected to network 115-1 or 115-2, that are associated with the account holder's account. The multiple different devices may include all devices used by the account holder and the account holder's family members, such as, for example, STBs 210, mobile devices 205, and computational devices 230. The account holder may then select one or more devices from the multiple different devices displayed in child device section 825 that are used by the child identified in child information section 805. Referring to the exemplary mobile UI 900 of FIG. 9A, which displays an expanded version of child device section 825 of FIG. 8B, the account holder selects two devices, including "iPhone 4S" 905 and "Kindle HDX Tablet" 910, from the list of devices shown. FIG. 9B depicts alternative use of the mobile UI 900, where the account holder instead selects three devices, including "iPhone 6" 915, "iPad3 Tablet" 920, and "Macbook Pro Laptop" 925 from the list of devices shown.

CFIA platform 150 stores the registration, authentication, children identification data, and device data in the account holder's profile (block 740). The account holder registration and authentication information, from blocks 700 and 710, including account holder ID, email address, phone number, home address, authentication information, etc., may be stored in account holder ID field 605 of account holder profile 600. The child information, from block 720, may be stored in family members field 625 of entry 605 of account holder profile 600. The selected devices, from block 730, may be stored in "per child devices" fields 630 of account holder profile 600. For example, referring to FIG. 6, if the account holder 100 selects devices 2 (d_2) and q (d_q) from the multiple different devices as being associated with (i.e., used by) child_n, then flags may be set, in association with child_n, for each of devices 2 and q, where devices 1 through q constitute all of the devices associated with the account of the account holder.

The exemplary process of FIG. 7 may be selectively repeated each time account holder 100 wishes to associate one or more devices with a family member. For example, when a new family member is added to the account, the process of FIG. 7 may be executed to associate one or more devices with that new family member. Additionally, the process of FIG. 7 may be repeated when one or more new devices are to be associated with one or more existing family members. Furthermore, the process of FIG. 7 may be executed to change the device or devices associated with an existing family member.

Figure 10:
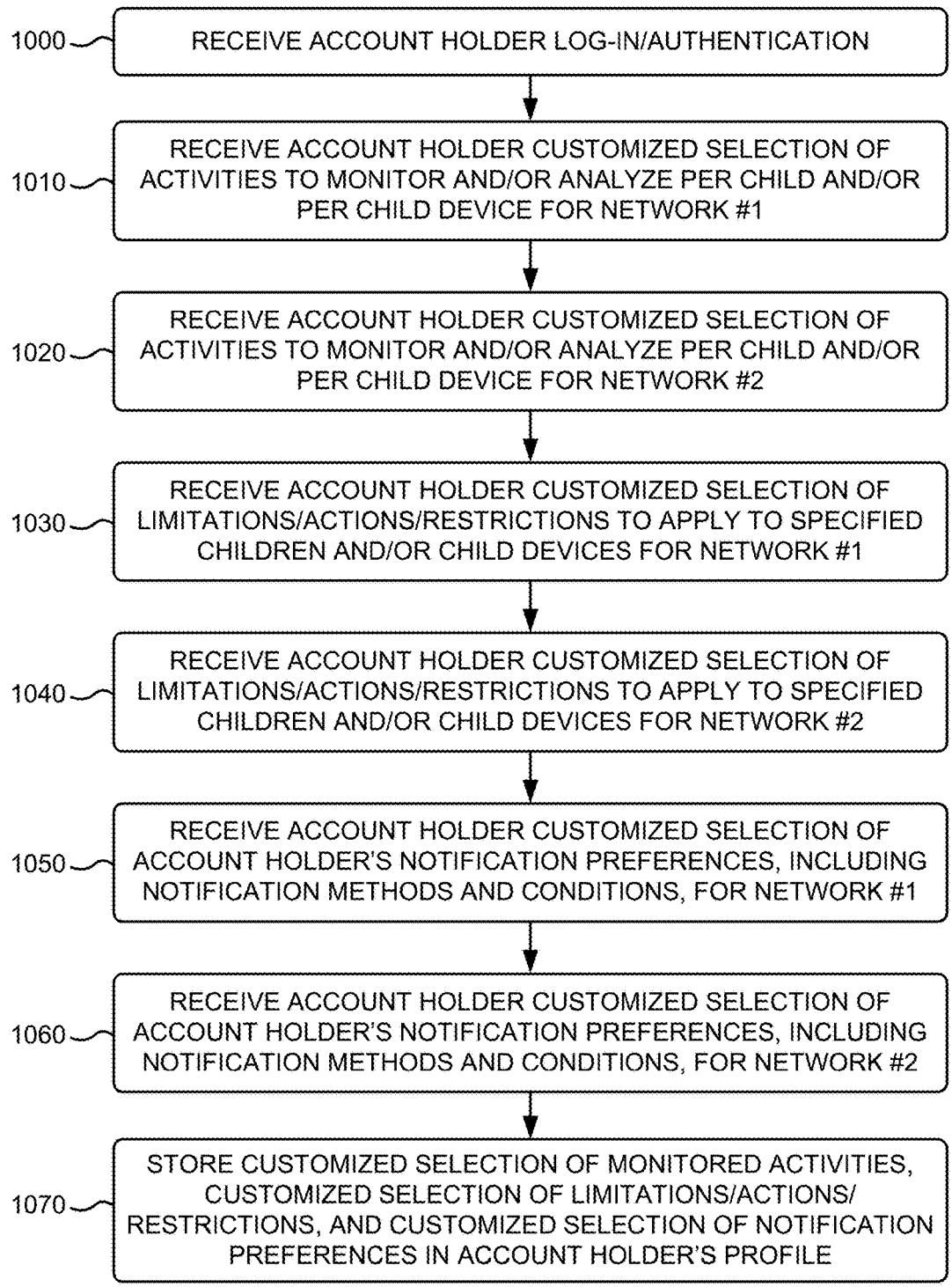
FIG. 10 is a flow diagram that illustrates an exemplary process for receiving and storing the account holder's customized selection of child activities to monitor, the account holder's customized selection of limitations, actions or restrictions to apply to specified children or their devices, and the account holder's preferences for notification regarding child activities.

FIG. 10 is a flow diagram that illustrates an exemplary process for receiving and storing the account holder's customized selection of child activities to monitor, the account holder's customized selection of limitations, actions or restrictions to apply to specified children or their devices, and the account holder's preferences for notification regarding child activities. The exemplary process of FIG. 10 may be implemented by CFIA platform 150. The exemplary process of FIG. 10 is described below with reference to FIGS. 11-19, and to previously described figures.

The exemplary process may include CFIA platform 150 receiving an account holder log-in and/or authentication (block 1000). Account holder 100 may, via phone 125-1 or computer 125-2, send log-in and/or authentication data to CFIA platform 150. CFIA platform 150, upon verification of the account holder's log-in and/or authentication, may permit the execution of the remainder of the blocks of FIG. 10. CFIA platform 150 receives the account holder's customized selection of activities to monitor and/or analyze per child and/or per child device for network #1 (block 1010), and receives the account holder's customized selection of activities to monitor and/or analyze per child and/or per child device for network #2 (block 1020). In one implementation, account holder 100 may select activities to monitor for one or more selected children, or for one or more selected devices of one or more of the account holder 100's children, based on the network to which the one or more devices are connected.

Figure 11:
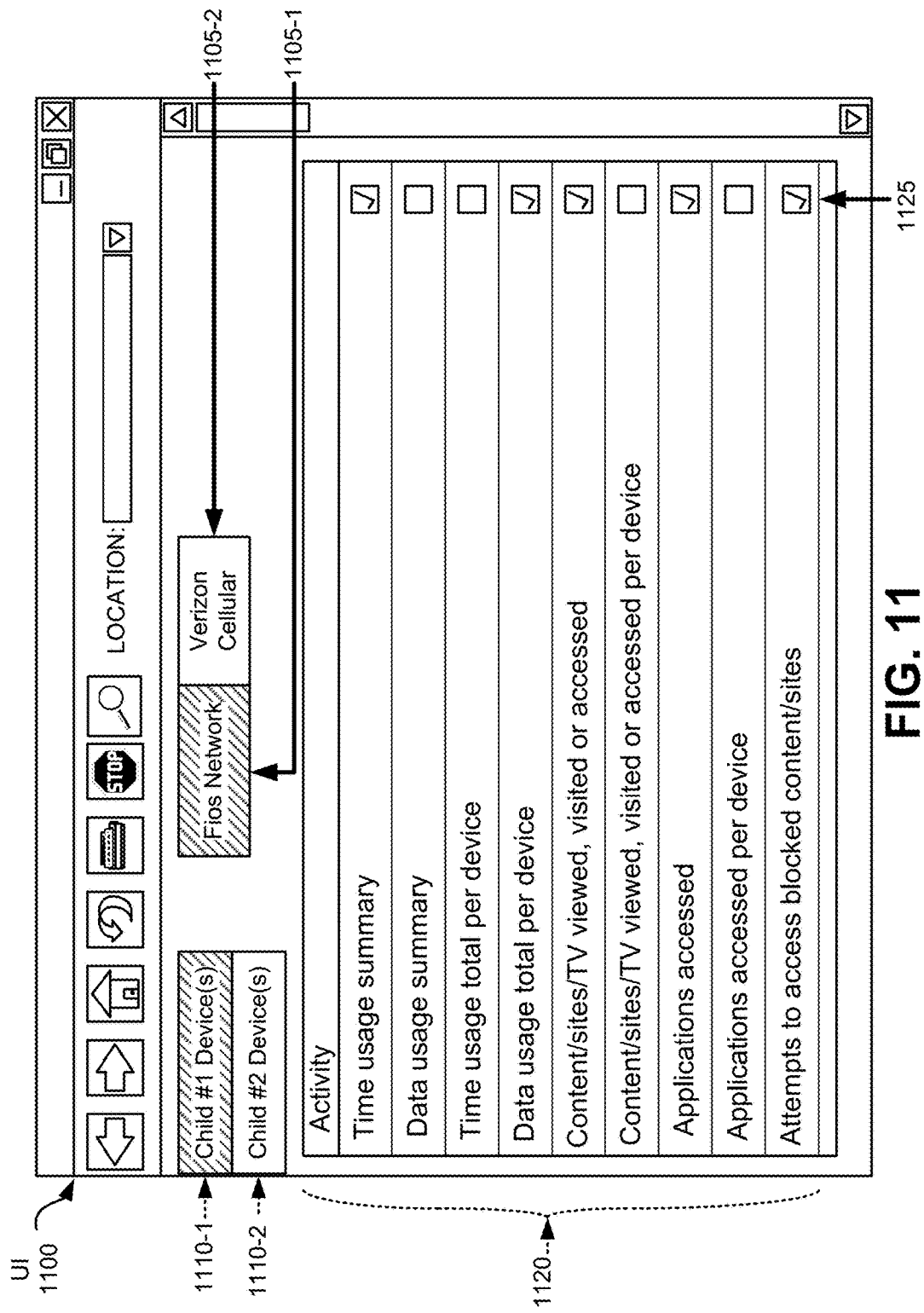
FIGS. 11-19 are diagrams depicting exemplary user interfaces associated with the process of FIG. 10.
Figure 12:
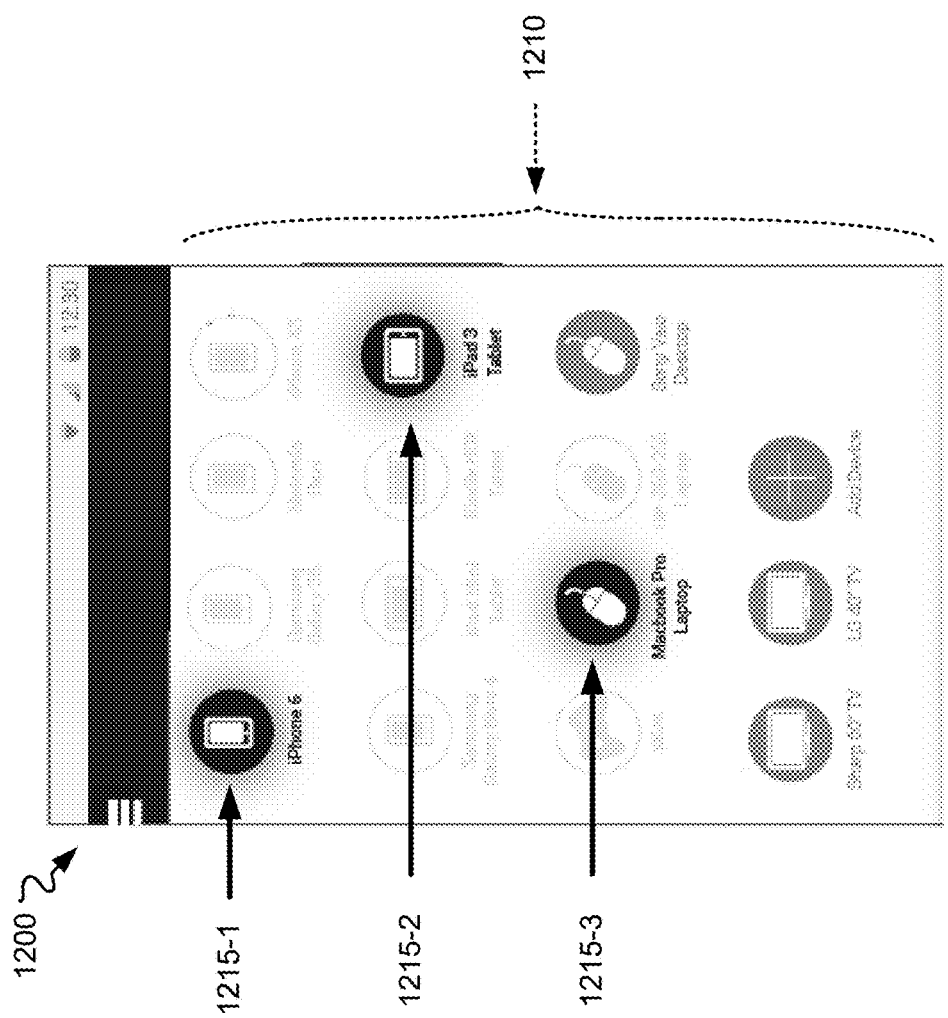

For example, account holder 100 may select a first set of activities to monitor and/or analyze from a first list of activities that is particular to devices connected to network 115-1 (network #1), and a second set of activities to monitor and/or analyze from a second list of activities that is particular to devices connected to network 115-2 (network #2). FIG. 11 depicts an exemplary UI 1100 that may be executed by a browser of computer 125-2 for use by account holder 100 in selecting activities to monitor and analyze. As shown, one of multiple networks may be selected, such as "FiOS™ network" 1105-1 (e.g., the home delivery network) or "Verizon Cellular" 1105-2 (e.g., the PLMN). Upon selection of the network, account holder 100 may further select which child and their devices are to be monitored. For example, as shown in FIG. 11, account holder 100 may select "Child #1 Device(s)" 1110-1 instead of "Child #2 Device(s)" 1110-2 for monitoring in the "FiOS™ Network." Upon selection of the network and child, account holder 100 may continue to select specific types of monitoring and/or analyzing to be carried out by CFIA platform 150 from a list 1120 of types of monitoring by "checking" a box 1125 associated with each listed type of activity monitoring. For example, list 1120 may include various types of activity monitoring and analysis such as, but not limited to, a time usage summary, a data usage summary, a time usage total per device, a data usage total per device, a content/sites/TV viewed, visited or accessed, a content/sites/TV viewed, visited or accessed per device, applications accessed, applications accessed per device, and attempts to access blocked content/sites.

A time usage summary summarizes time usage associated with child/device activity over a certain period of time (e.g., per day). A data usage summary summarizes child/device data usage associated with child/device activity over a certain period of time. A time usage total per device indicates a total time a particular device has been engaged in active use for a certain time period. A data usage total per device indicates a total amount of data transmitted/received by a particular device during a certain time period.

Content/sites/TV programs viewed, visited or accessed details the content, web sites, and TV programs accessed, visited and/or viewed by a particular child. Content/sites/TV programs viewed, visited or accessed per device details the content, web sites, and TV programs accessed, visited and/or viewed at a particular device. Applications accessed details applications accessed via one or more devices by a particular child. Applications accessed per device details applications accessed by a particular child per device. Attempts to access blocked or flagged content/sites indicate details of a particular child's attempts to access blocked or flagged contents/sites, TV programs, including a day and time of the access attempts.

In another implementation, account holder 100 may select activities to monitor irrespective of which network to which the child devices are connected. For example, account holder 100 may select a set of activities to monitor and/or analyze from a list that applies to devices connected to both network 115-1 and network 115-2. In a further implementation, instead of selecting all devices associated with a specific child of account holder 100, account holder 100 may, via phone 125-1 or computer 125-2, choose one or more devices associated with a specific child for monitoring selected activities. For example, referring to FIG. 12, the account holder may, using a UI 1200 view a set 1210 of devices associated with a certain child, and may select one or more of the devices for monitoring and/or analyzing activities selected via another UI, such as, for example, a UI similar to UI 1100 shown in FIG. 11.

CFIA platform 150 receives the account holder's customized selection of limitations, actions or restrictions to apply to specified children and/or child devices for network #1 (block 1030), and receives the account holder's customized selection of limitations, actions or restrictions to apply to specified children and/or child devices for network #2 (block 1040). In one implementation, account holder 100 may select limitations, actions and/or restrictions to apply to specific children and/or specific child devices based on the network to which one or more of the child devices are connected. In another implementation, account holder 100 may select limitations, actions and/or restrictions to apply to specific children and/or specific child devices irrespective of which network to which one or more of the child devices are connected. For example, account holder 100 may select a set of limitations, actions and/or restrictions from one or more lists for application to devices connected to either, or both of, networks 115-1 and 115-2. In a further implementation, instead of selecting all devices associated with a specific child of account holder 100 for applying selected limitations, actions and/or restrictions, account holder 100 may, via phone 125-1 or computer 125-2 choose one or more devices associated with a specific child for applying selected limitations, actions and/or restrictions.

The limitations, actions and/or restrictions may include, for example, a parent control age group applied to content/sites/TV programs viewed, accessed or visited; a parent control level(s) applied to content/sites/TV viewed, accessed or visited; categories of content filtering to apply to content/sites/TV viewed, accessed or visited; restrictions on the purchase or downloading of apps; time restrictions on child device usage; maximum usage limitations to apply to one or more devices associated with a child; and/or restrictions on texting or calling to/from unknown contacts or contacts associated with a "watchlist," where the watchlist includes a list of flagged or prohibited individuals.

Figure 13B:
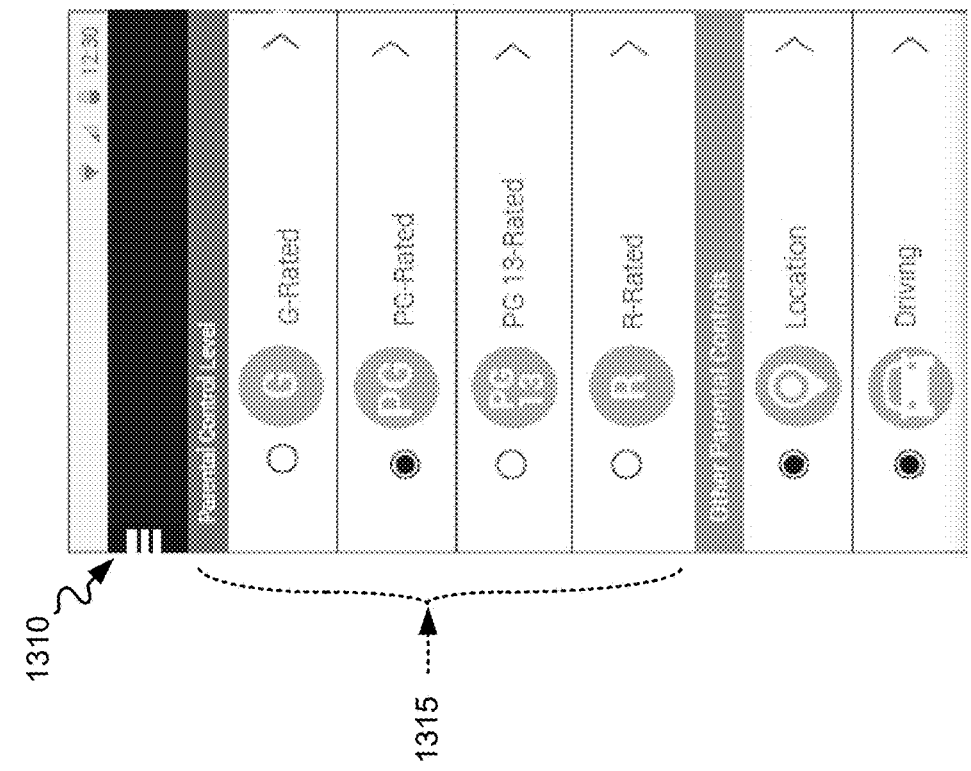
Figure 13A:
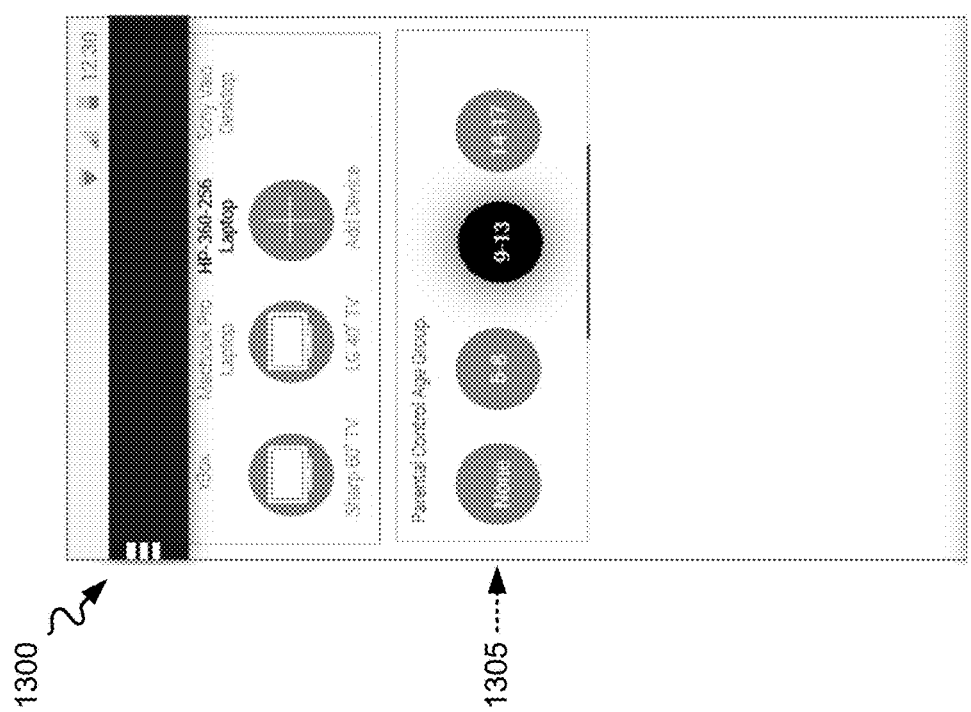

FIG. 13A depicts an exemplary UI 1300 that permits the selection of a parental control age group for a child, or a child device, from multiple parental control age groups 1305. In the example of FIG. 13A, the multiple parental control age groups 1305 include "none," ages "5-8," ages "9-13," and ages "14-17." Selection of one of the parental control age groups 1305 causes CFIA platform 150 to apply age appropriate restrictions to the content/sites/TV programs viewed, accessed or visited by the child.

FIG. 13B depicts an exemplary UI 1310 that permits the selection of a parental control level for a child, or a child device, from multiple parental control levels 1315. In the example of FIG. 13B, the multiple parental control levels 1315 include "G-rated," "PG-rated," "PG 13-rated," and "R-rated" that are similar to the ratings applied by the Motion Picture Association of America (MPAA) to films. Selection of one of the parental control levels 1315 causes CFIA platform 150 to apply restrictions to the content/sites/TV programs viewed, accessed or visited by the child that is appropriate to the selected parental control level. For example, selection of a "G-rated" parental control level causes CFIA platform 150 to only permit viewing, accessing, or visiting of content, sites or TV programs that has a subject matter acceptable to all ages.

Figure 14B:
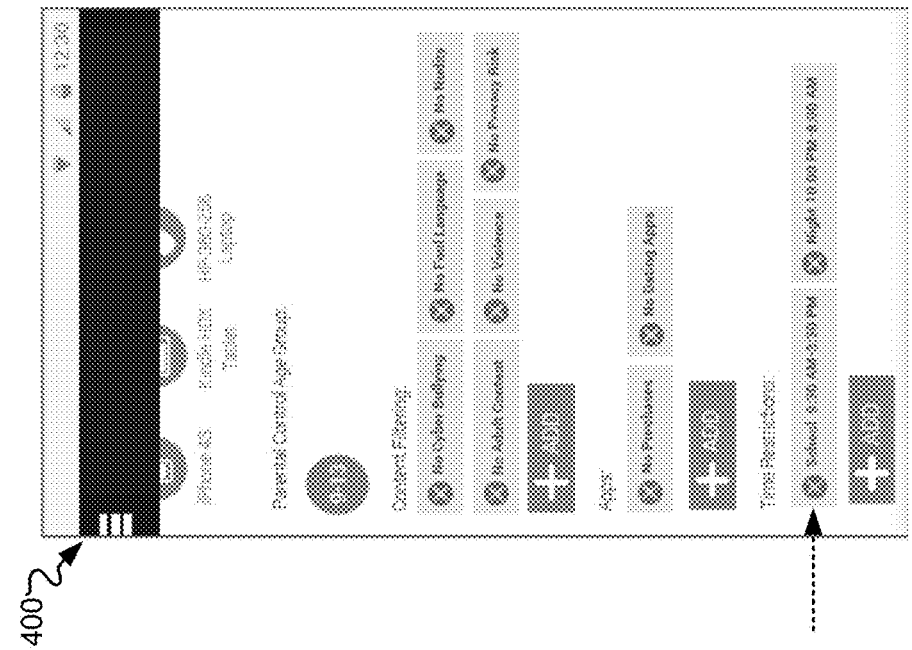
Figure 14A:
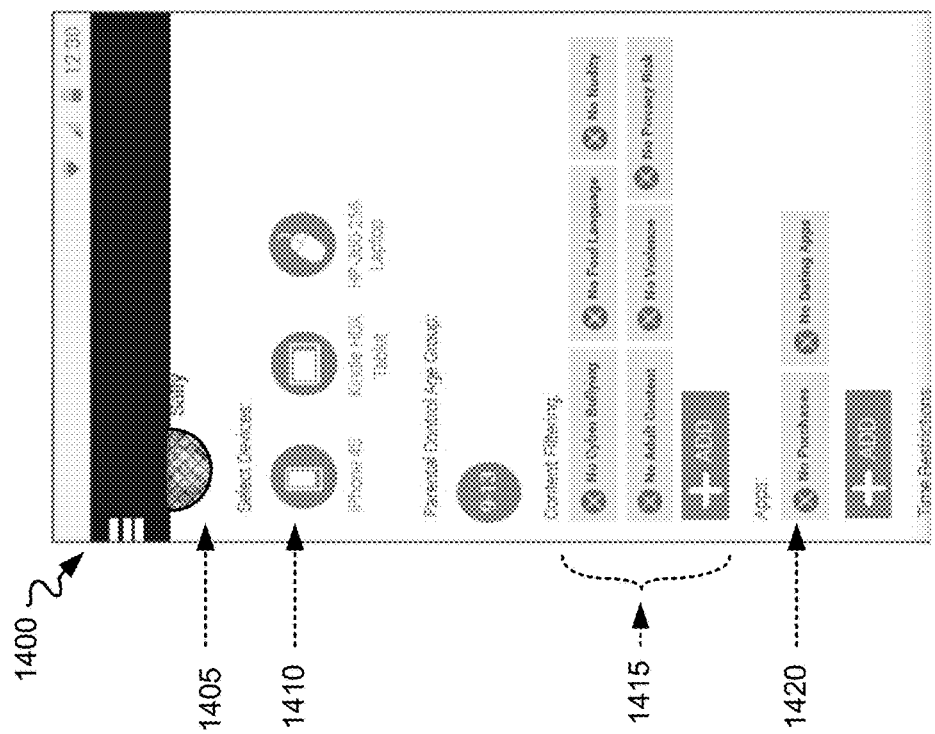

FIGS. 14A and 14B depict an exemplary mobile UI 1400 that permits account holder 100 to select a specific child 1405, one or more selected devices 1410 used by the child, one or more of multiple content filtering categories 1415 to be applied to content/sites/TV programs viewed, accessed or visited by the specific child 1405 via selected devices 1410, one or more app purchasing/downloading restrictions 1420 to be applied to the specific child 1405 while using devices 1410, and one or more time period restrictions 1425 to be applied to the specific child 1405 while using devices 1410. For example, as shown in FIG. 14A, content filtering categories 1415 that may be selected from mobile UI 1400 may include "no cyber bullying," "no foul language," "no nudity," "no adult content," "no violence," and "no privacy risk." Selection of "no cyber bullying" restricts the child from viewing, accessing or visiting content/sites/TV programs that have been associated with cyber bullying. Selection of "no foul language" restricts the child from viewing, accessing or visiting content/sites/TV programs that include profanity or foul language. Selection of "no nudity" restricts the child from viewing, accessing or visiting content/sites/TV programs that include nudity. Selection of "no adult content" restricts the child from viewing, accessing or visiting content/sites/TV programs that include content designated as being of an adult nature. Selection of "no violence" restricts the child from viewing, accessing or visiting content/sites/TV programs that include violence. Selection of "no privacy risk" restricts the child from viewing, accessing or visiting content/sites/TV programs that have been designated as involving risks to the privacy of the child.

As further shown in the exemplary mobile UI 1400 of FIG. 14A, app purchasing/downloading restrictions 1420 to be applied to the specific child 1405 while using devices 1410 may include a "no purchases" and a "no dating apps" restriction. Selection of "no purchases" prevents the specific child 1405 from purchasing apps or other products while using devices 1410. Selection of "no dating apps" prevents the specific child 1405 from purchasing/downloading dating apps while using devices 1410.

As also shown in the exemplary mobile UI 1400 of FIG. 14B, time period restrictions 1425 may designate certain periods (daily, weekly, etc.) during which the specific child 1405 is prohibited from using selected devices 1410. For example, as shown in FIG. 14B, a daily school period from 9:30 am to 3:30 pm, and a daily "curfew" period from 10:00 pm to 8:00 am may be prohibited time periods for the specific child 1405 to use the selected devices 1410.

Figure 15:
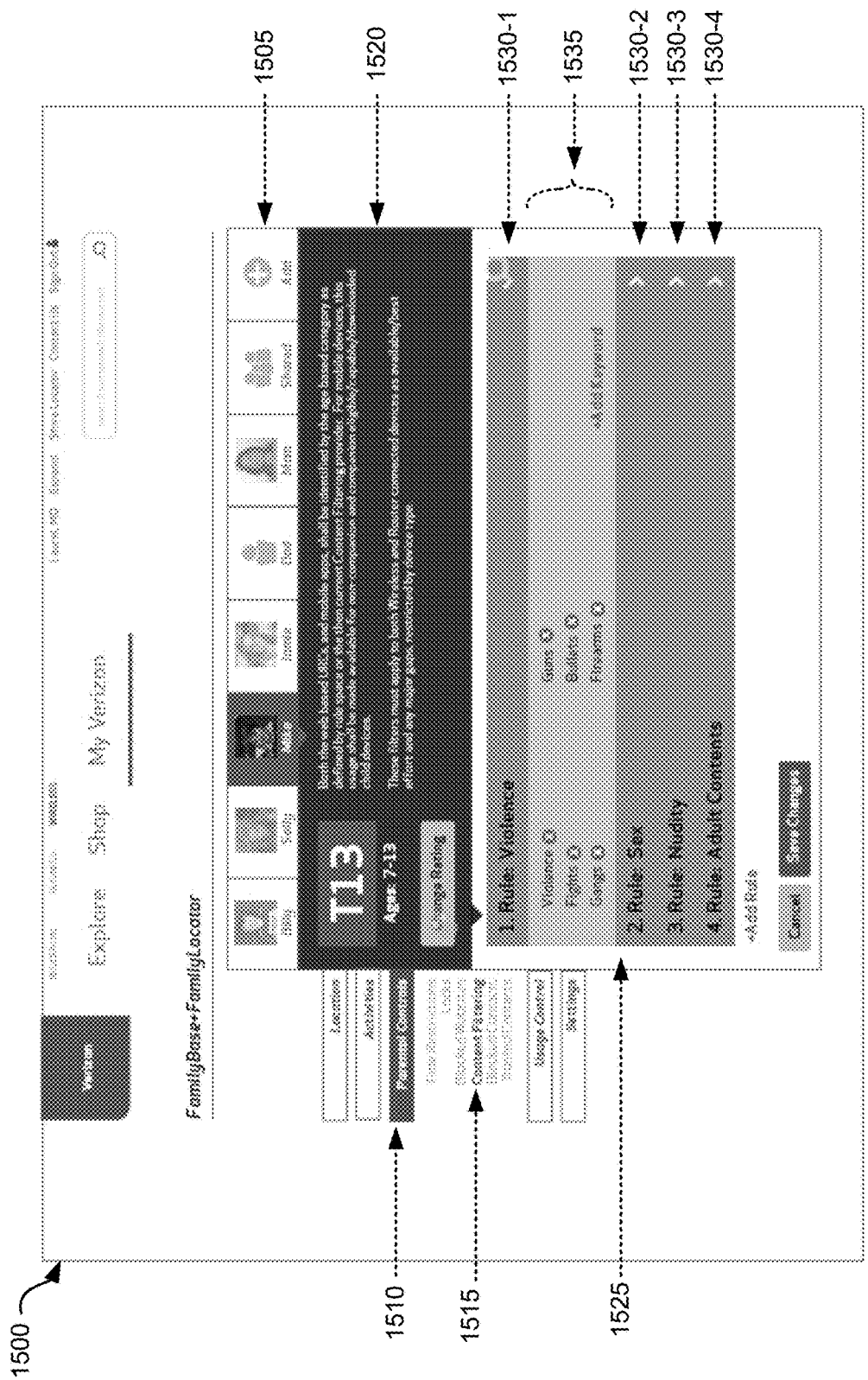

FIG. 15 depicts an exemplary UI 1500 that may be implemented within a browser of computer 125-2 for enabling account holder 100 to select parental controls and content filtering that may be applied to a child or child devices. As shown, UI 1500 may include a child or device selection area 1505 that enables account holder 100 to select a specific child (e.g., "Mike" shown) for applying parental controls. Upon selection of the specific child, account holder 100 may select "parental controls" 1510 from a menu, and may select "content filtering" from a sub-menu that includes "time restrictions," "locks," "blocked websites," "content filtering," "blocked contacts," and "trusted contacts." Upon selection of "content filtering," account holder 100 may select a particular age group 1520 for the selected child that defines the content that is considered age appropriate for the child. A content filtering rule section 1525 further permits account holder 100 to add one or more customizable rules (rules 1530-1 through 1530-4 shown by way of example), and multiple default content prohibitions 1535 may further be selectable under each of the customizable rules. For example, the exemplary UI 1500 of FIG. 15 depicts "violence," "sex," "nudity," and "adult content" rules, with the default content prohibitions 1535 of the "violence" rule 1530-1 being displayed. Account holder 100 may remove one or more of the default content prohibitions 1535 from the "violence rule." For example, account holder 100 may select (e.g., "click" on the "X") "guns" and "bullets" to remove those content prohibitions from the customizable "violence" rules applied to content/websites/TV programs viewed, accessed or visited by the particular child (e.g., "Mike" in the example shown in FIG. 15). Upon completion of selecting/adding all content prohibition rules, and customizing the default content prohibitions under each rule, account holder may select (e.g., "click on") "save changes" to cause CFIA platform 150 to store the parental controls and content filtering rules.

Figure 16:
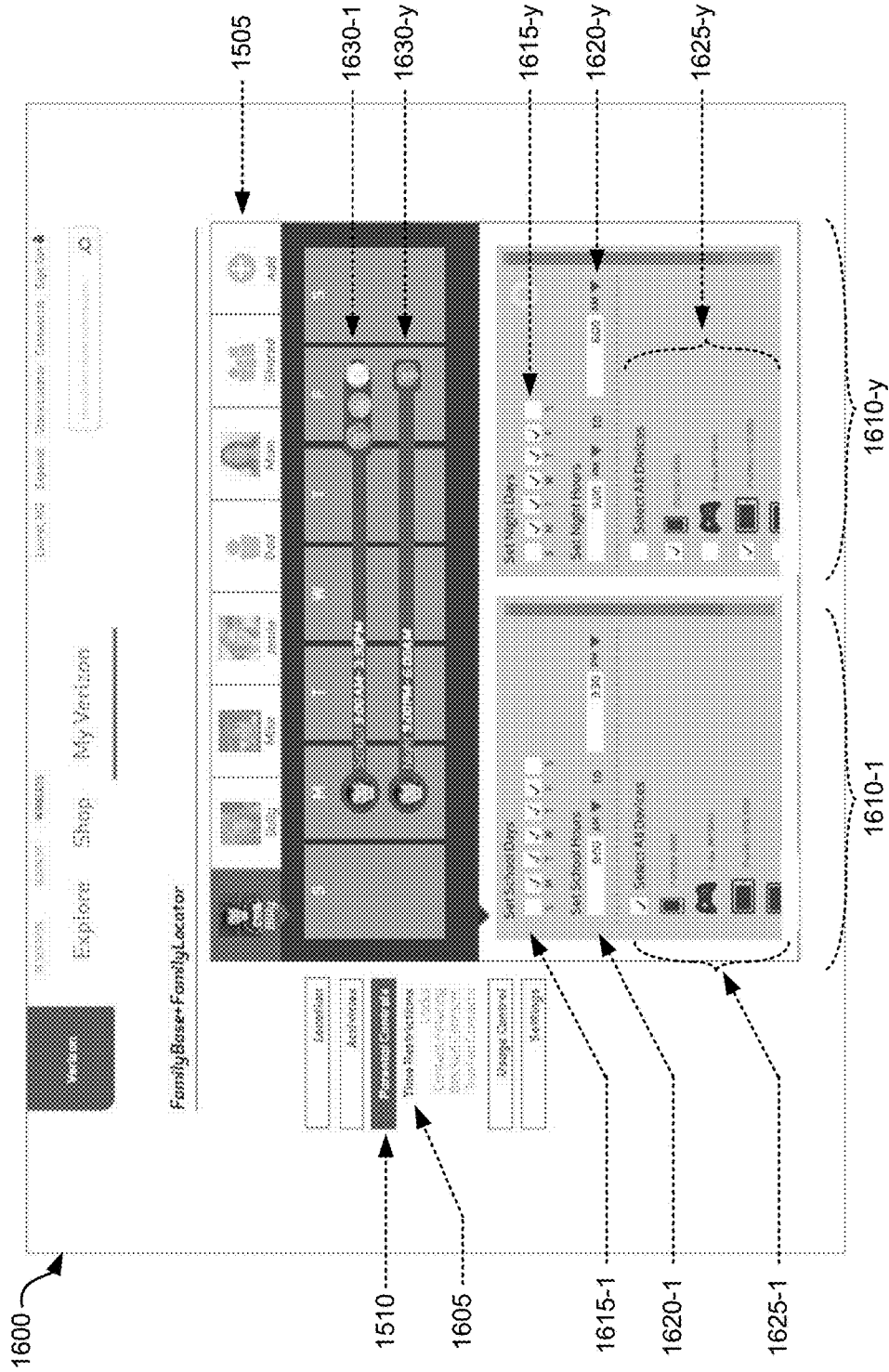

FIG. 16 depicts an exemplary UI 1600 that may be implemented within a browser of computer 125-2 for enabling account holder 100 to select time restrictions that may be applied to a child, or a child device(s), during which activity by the child and/or child device(s) is prohibited. As shown, UI 1600 may include child or device selection area 1505 that enables account holder 100 to select a specific child (e.g., "Billy" shown) or a specific device(s) for applying time restrictions. Upon selection of the specific child, account holder 100 may select "parental controls" 1510 from a menu, and may further select "time restrictions" from a sub-menu. Upon selection of "time restrictions," account holder 100 may customize one or more time restriction periods 1610-1 through 1610-$y$ (where y is greater than or equal to one) to be applied to the specific selected child. For example, account holder 100 may create a first time restriction period 1610-1 which includes one or more selected days 1615-1 of the week (M-F shown selected), a time period 1620-1 that includes a beginning time and an ending time (9:00 am to 3:30 pm shown), and a selection of one or more devices 1625-1 used by the selected child ("select all devices" shown). As another example, account holder 100 may create another time restriction period 1610-$y$ which includes one or more selected days 1615-$y$ of the week (M-F shown), a time period 1620-$y$ that includes a beginning time and an ending time (9:00 pm to 6:00 am), and a selection of one or more devices 1625-$y$ used by the selected child (two devices shown as being selected). Restriction timelines 1630-1 and 1630-$y$, corresponding to time restriction periods 1610-1 and 1610-$y$, respectively, may be shown in UI 1600. Each restriction timeline 1630 may identify the child associated with the time restriction period, the days of the week involved in the time restriction period, and the interval during each day that the time restriction applies.

Figure 17:
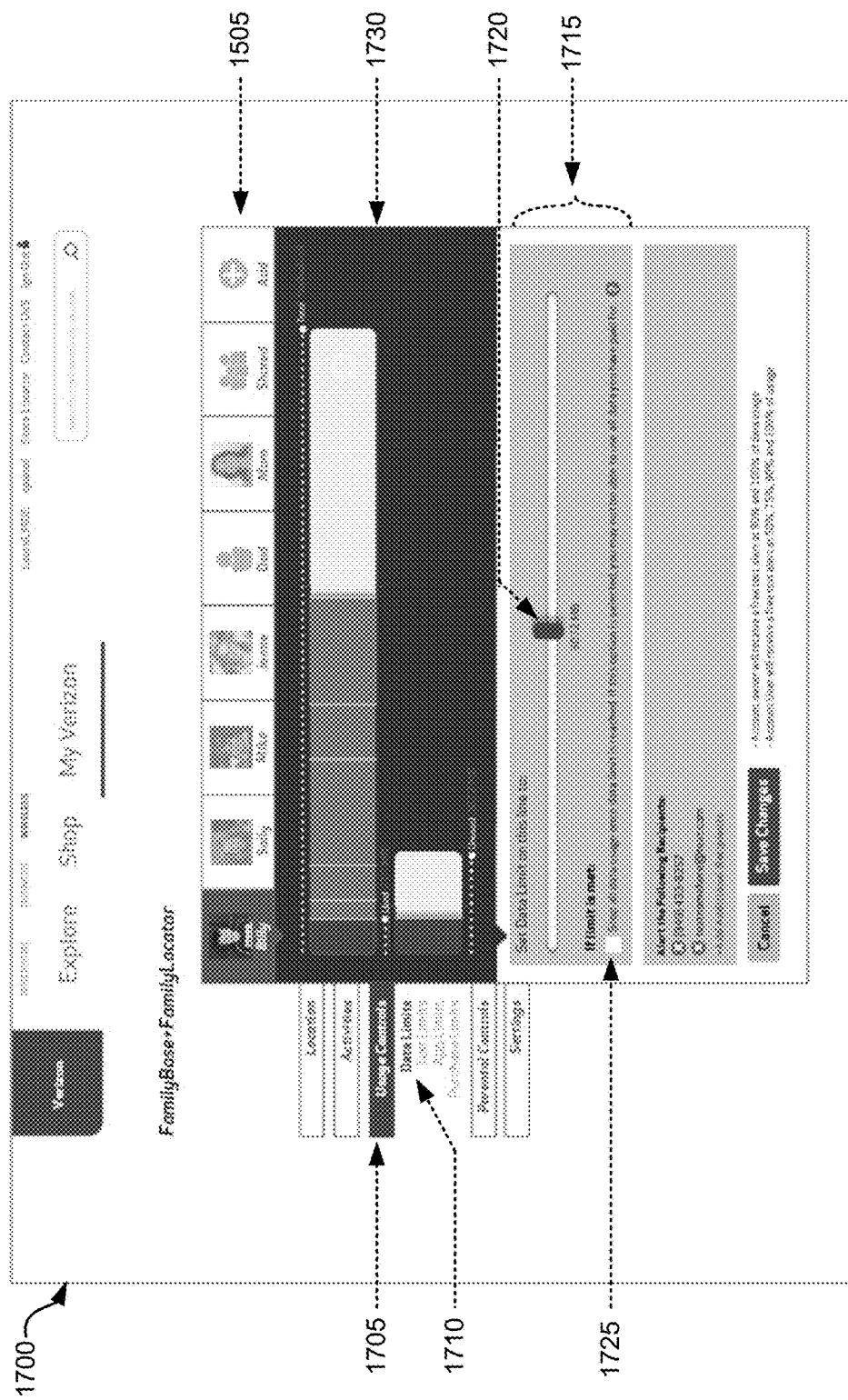

FIG. 17 depicts an exemplary UI 1700 that may be implemented within a browser of computer 125-2 for enabling account holder 100 to select usage controls that may be applied to a child or child devices. As shown, UI 1700 may include a child or device selection area 1505 that enables account holder 100 to select a specific child (e.g., "Billy" shown) or a specific device(s) for applying parental controls. Upon selection of the specific child, account holder 100 may select "usage controls" 1705 from a menu, and may select "data limits" from a sub-menu that includes "data limits," "text limits," "app limits," and "purchase limits." Upon selection of "data limits," account holder 100 may, in a data limit section 1715 of UI 1700, specify a particular total data limit 1720 that may apply to a device or devices used by the selected child (a limit of 3072 Megabytes (MB) shown). Additionally, account holder 100 may select, in data limit section 1715, a control box 1725 that, upon selection (e.g., checking the box) causes CFIA platform 150 to stop all data usage by the selected child once the specified data limit is reached. A current data usage window 1730 may be displayed in UI 1700 that enables account holder 100 to view a current usage of the particular child relative to the specified data limit for that child.

Figure 18:
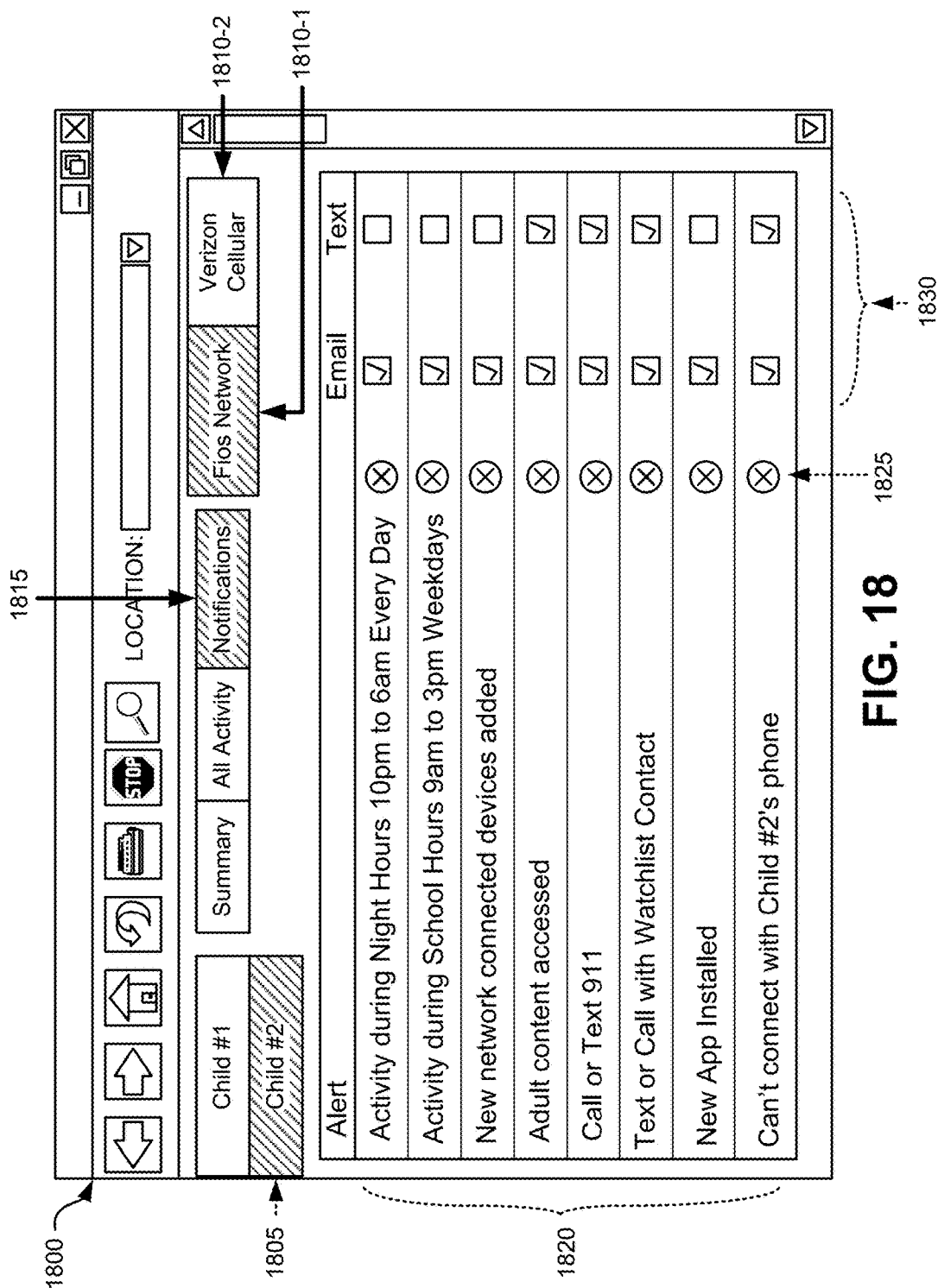
Figure 19:
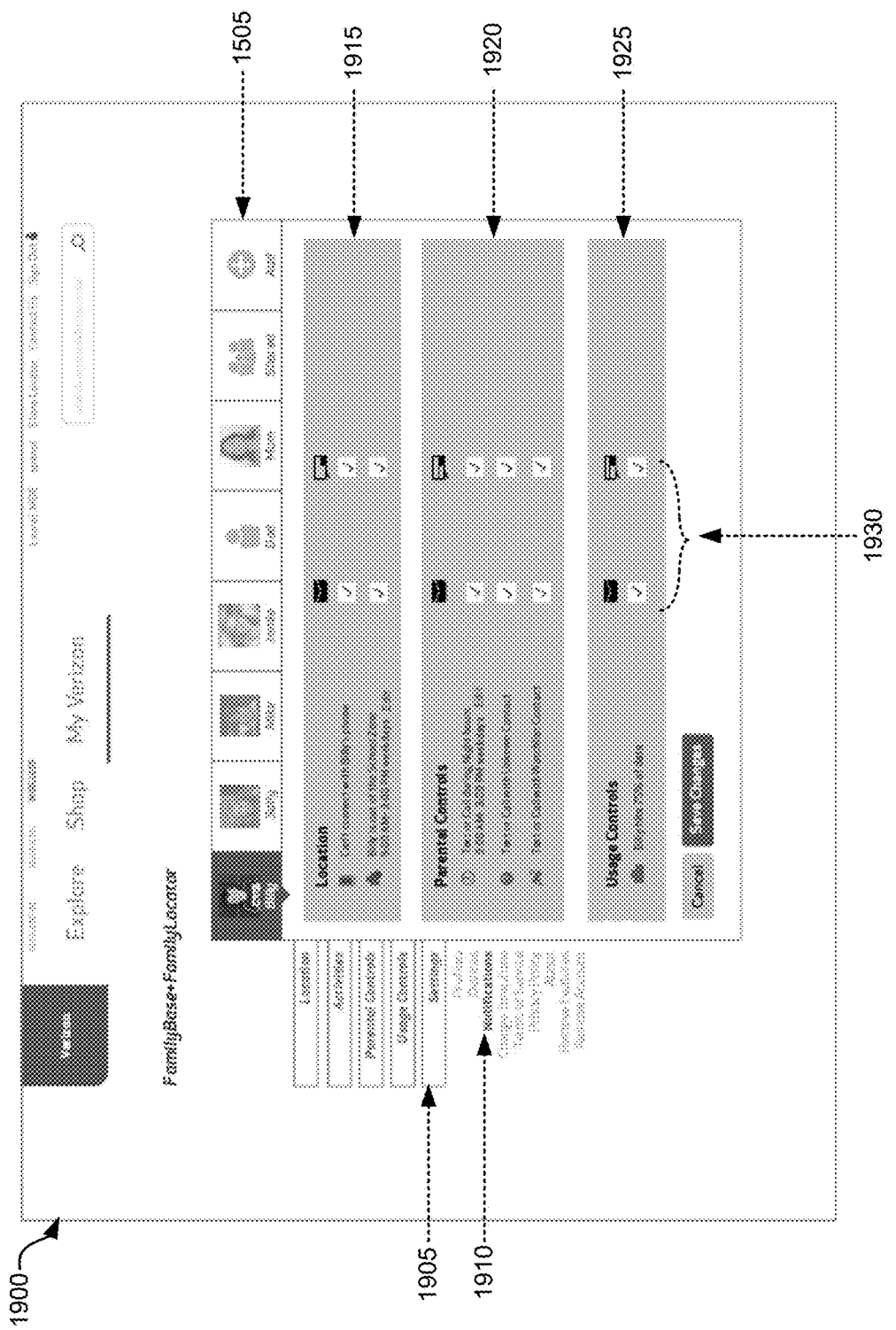

CFIA platform 150 receives the account holder's customized selection of the account holder's notification preferences, including notification methods and conditions, for network #1 (block 1050), and receives the account holder's customized selection of the account holder's notification preferences, including notification methods and conditions, for network #2 (block 1060). FIGS. 18 and 19 depict exemplary UIs that may be implemented by a browser of computer 125-2 for enabling account holder 100 to select notification preferences for a particular child and/or child devices. FIG. 18 depicts an exemplary UI 1800 that enables the selection of notification preferences per network for selected children. As shown, UI 1800 permits account holder 100 to select a child 1805 from among account holder 100's children, select a network among multiple networks (FiOS™ network 1810-1 and Verizon Cellular 1810-2 shown), and select "notifications" 1815. Upon selection of "notifications," multiple different default notification options 1820 may be displayed. For each of the default notification conditions 1820, account holder 100 may choose to delete that particular default notification condition (e.g., "click on" the associated "X" 1825) or may select one or more preferred methods 1830 (e.g., email and/or text) for receiving a notification when a particular condition is satisfied. For example, as shown in FIG. 18, the notification conditions 1820 may include activity during certain night hours, activity during certain school hours, the connection of new network devices, accessing of adult content, calling or texting 911, texting or calling a watchlist contact, installation of a new app, and/or a failure of network connection to the child's phone.

FIG. 19 depicts another example of a UI 1900 that enables the selection of notification preferences per selected child. As shown, UI 1900 may include child or device selection area 1505 that enables account holder 100 to select a specific child (e.g., "Billy" shown) for whom the selected notification preferences apply. Upon selection of the specific child, account holder 100 may select "settings" 1905 from a menu, and may further select "notifications" from a sub-menu. Upon selection of "notifications," various different types of notification conditions 1915, 1920 and 1925, including corresponding details of the notification conditions, may be displayed in UI 1900. For example, UI 1900 may display location conditions 1915 related to a current location of the child's device, parental control conditions 1920 that include conditions associated with restrictions on the child's usage of a device(s), and usage control conditions 1925 that include conditions related to the amount of the child's usage of a device(s). Each condition listed in the condition categories 1915, 1920 and 1925 may further include a means for selecting whether, if the condition is satisfied, what method of contact is to be used to contact account holder 100. For example, each condition listed under the condition categories 1915, 1920 and 1925 may include an email checkbox, and a text checkbox 1930. One or more checkboxes may be selected (e.g., "clicked on") to enable the corresponding notification method. As shown in FIG. 19, location conditions 1915 may include a condition that account holder 100 is notified when the child's phone loses connection with the network (e.g., for an extended period of time), and a condition that indicates that the child is currently located outside of a geographic area associated with the child's school. In one implementation, in addition to notifying account holder 100 when the child's phone loses connection with the network, the notification may additionally include an indication of a cause of the disconnection, such as, for example, an indication of disconnection due to a poor signal at the child device, the child device's battery ran out of charge, the child device's battery was removed, the child device was turned off, the operating system of the child device "froze," or disconnection occurred due to network congestion. As further shown in FIG. 19, parental control conditions 1920 may include a condition that account holder 100 is notified when the child makes a text or call during certain night time hours, when the child makes a text or call with an unknown contact, or when the child makes a text or call with a watchlist contact. As also shown in FIG. 19, usage control conditions 1925 may include a condition that account holder 100 is notified when the child's data usage associated with one or more devices reaches a threshold limit (e.g., 75% of allocated data usage maximum). Upon satisfaction of any of the conditions selected by account holder 100, the selected method of contact is used by CFIA platform 150 to notify account holder 100 that any selected condition or conditions were met. For example, when the selected condition involves certain child activity, the selected method of contact is used to notify account holder 100 when the occurrence of the certain child activity satisfies a specified condition.

CFIA platform 150 stores the customized selection of monitored activities, the customized selection of limitations, actions and restrictions, and the customized selection of notification preferences in the account holder's profile (block 1070). Referring to FIG. 6, the customized selection of monitored activities for a particular child may be stored in "activities to monitor" field 650 in an entry 610 having data within child field 635 that matches the selected child. Further, the customized selection of limitations, actions and restrictions for the particular child may be stored in "actions/limitations/restrictions" field 655 in the entry 610 having data within child field 635 that matches the selected child. Additionally, the customized selection of notification preferences for the particular child may be stored in "notification preferences" field 660 in the entry 610 having data within child field 635 that matches the selected child.

One or more blocks of the process of FIG. 10 may be repeated to change activities to monitor, limitations/actions/restrictions, and/or notification preferences associated with a particular child of account holder 100. For example, blocks 1000-1020 may be repeated to change the activities to monitor for a specified child of account holder 100. As another example, blocks 1000, 1030 and 1040 may be repeated to change the limitations, actions and/or restrictions to be applied to a specified child of account holder 100.

Figure 20:
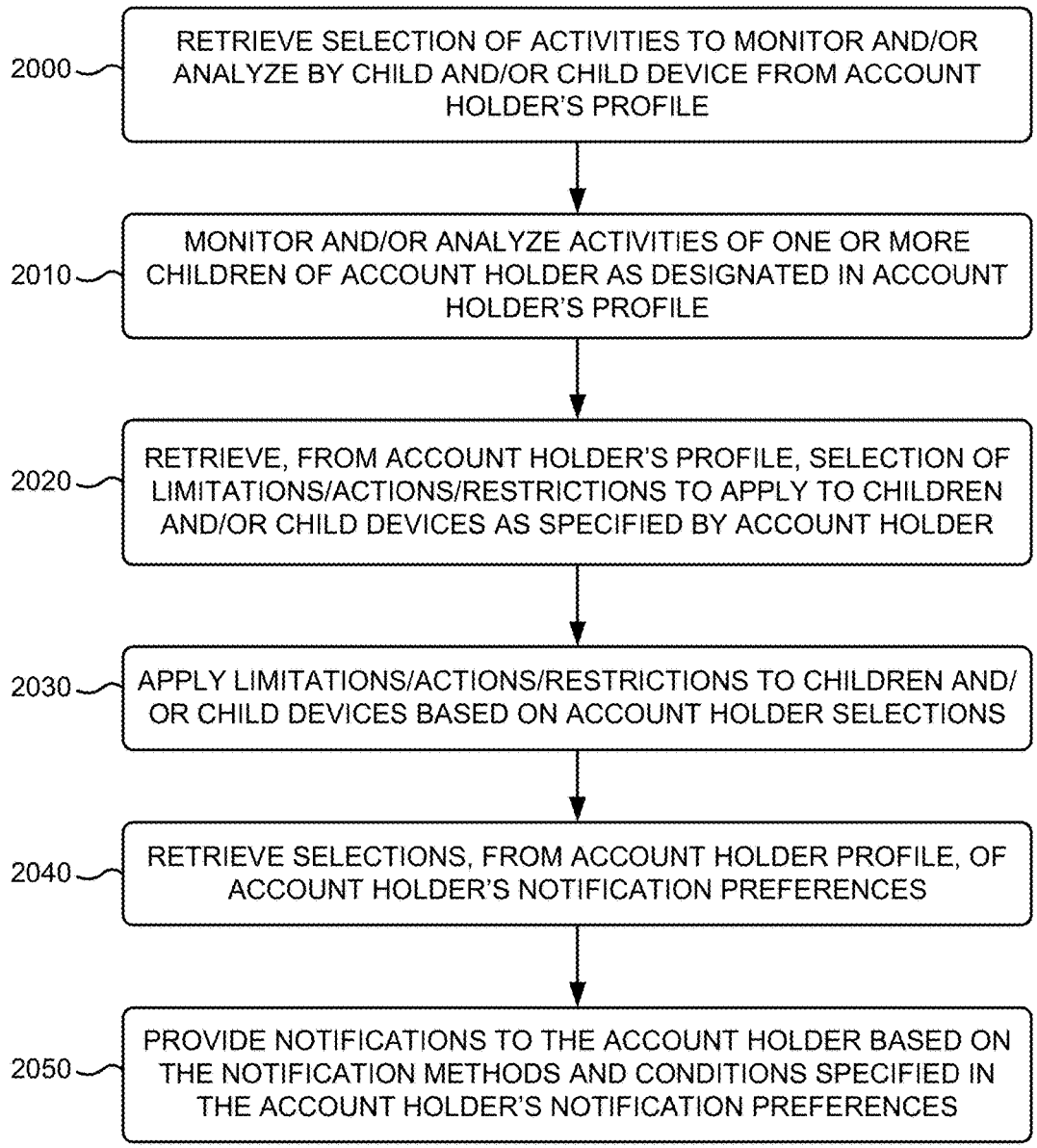
FIG. 20 is a flow diagram that illustrates an exemplary process for monitoring child activity in multiple networks, applying restrictions to child devices, and providing notifications to an account holder based on customized input provided by the account holder.

FIG. 20 is a flow diagram that illustrates an exemplary process for monitoring child activity in multiple networks, applying restrictions to child devices in those networks, and providing notifications to an account holder based on customized input provided by the account holder. The exemplary process of FIG. 20 may be implemented by CFIA platform 150. The exemplary process of FIG. 20 is described below with reference to FIGS. 21-29, and to previously described figures.

The exemplary process may include CFIA platform 150 retrieving the customized selection of activities to monitor and/or analyze by child and/or child device from the account holder's profile (block 2000). For each account, having a corresponding account holder profile 600, CFIA platform 150 locates the account holder profile 600 having data in account holder ID field 605 that matches the account holder's ID, and retrieves activities to monitor from field 650 of an entry 610 that corresponds to the account holder's ID. CFIA platform 150 monitors and/or analyzes activities of one or more children of the account holder as designated in the account holder's profile (block 2010). CFIA platform 150, possibly in conjunction with network devices located in networks 115-1 and 115-2, monitors and analyzes activity of selected children and/or selected child devices based on the retrieved customized selection of activities to monitor. The results of the monitoring and analysis may be stored by CFIA platform 150 and made available to account holder 100 via phone 125-1 or computer 125-2.

Figure 21:
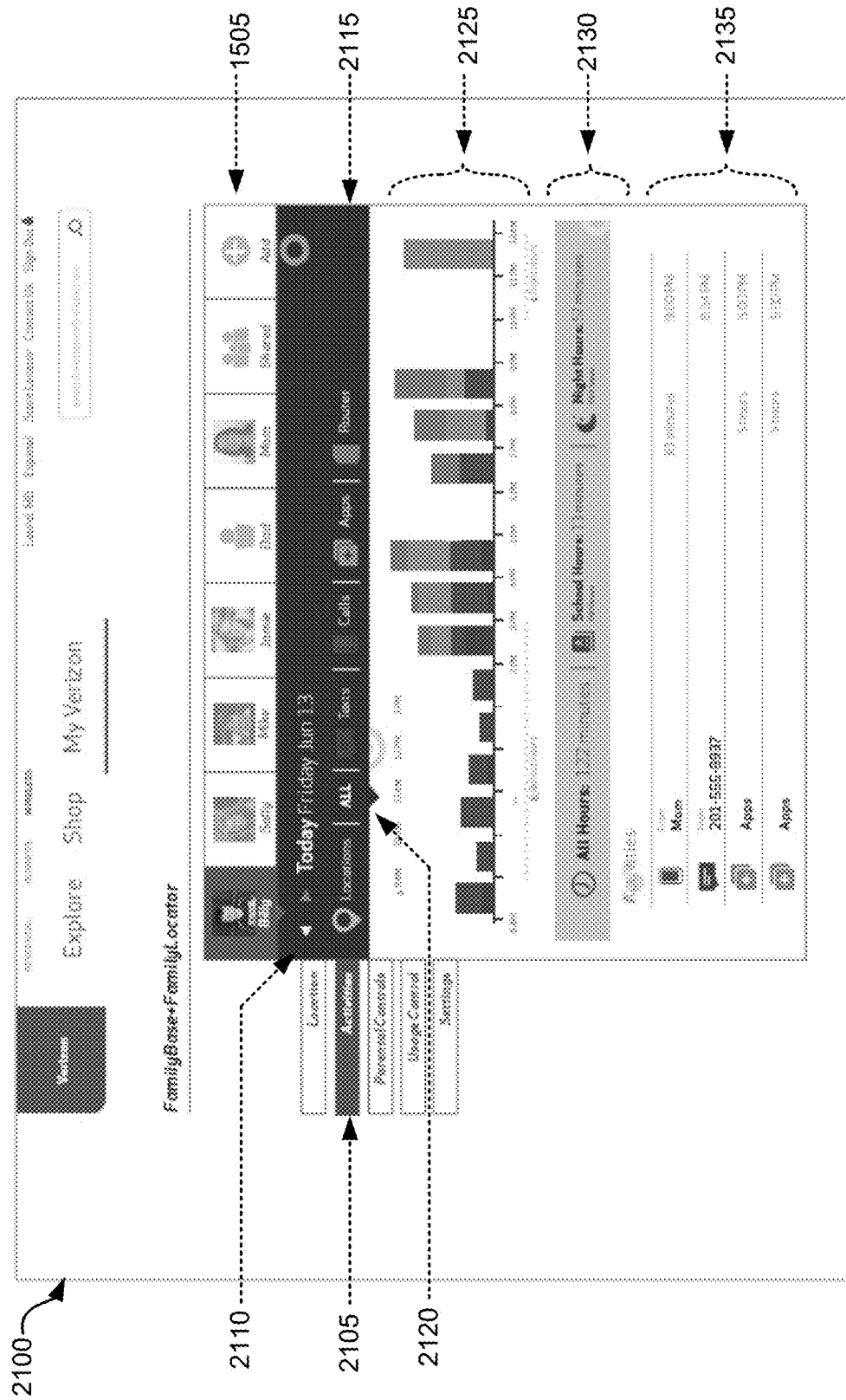
FIGS. 21-29 are diagrams depicting exemplary user interfaces associated with the process of FIG. 20.

For example, FIG. 21 depicts an exemplary UI 2100 that may be implemented within a browser of computer 125-2 for enabling account holder 100 to view the results of the monitoring and analysis of a selected child and/or child device. As shown, UI 2100 may include a child selection area 1505 that enables account holder 100 to select a specific child (e.g., "Billy" shown) for viewing that child's activity in multiple networks. Upon selection of the specific child, account holder 100 may select "activities" 2105 from a menu, and may select a particular time period (e.g., particular date) from a time period selection area 2110 of UI 2100. Account holder 100 may further select, from a child device/activity selection area 2115 of UI 2100, a particular device or devices, and/or particular types of activity, to view the results of the monitoring and analysis. For example, child device/activity selection area 2115 may include "all" devices, "texts," "calls," "apps," and "router." Though not shown in FIG. 21, child device/activity selection area 2115 may additionally permit the selection of each individual device used by the selected child for viewing the monitoring and analysis results of that particular device. In the example of FIG. 21, account holder 100 has selected "all" devices used by "Billy." UI 2100 may display a usage timeline 2125 for the selected child and selected child device/activity, where usage timeline 2125 displays intervals of time (e.g., per hour) and a bar graph depiction of relative network activity for the selected device(s) or activity during each of the intervals of time. UI 2100 may further include a "summary" section 2130 that summarizes the activity of the child for the selected device or activity. In the example shown in FIG. 21, summary section 2130 displays the total time spent by "Billy" using all of the devices associated with "Billy," the total time spent by "Billy" during school hours for all of the devices, and the total time spent by "Billy" during night hours for all of the devices. UI 2100 may further include a detailed activity section 2135 that displays a log of the activities engaged in by "Billy" for "all" devices used by "Billy" during the selected time period. The log of activities may include displaying calls/texts, and who the calls/texts originated from, or to whom "Billy" made calls/texts, and displaying app usage (e.g., name of app and time spent using it) by "Billy." All types of monitored network activity may be displayed in detailed activity section 2135 of UI 2100.

Figure 22:
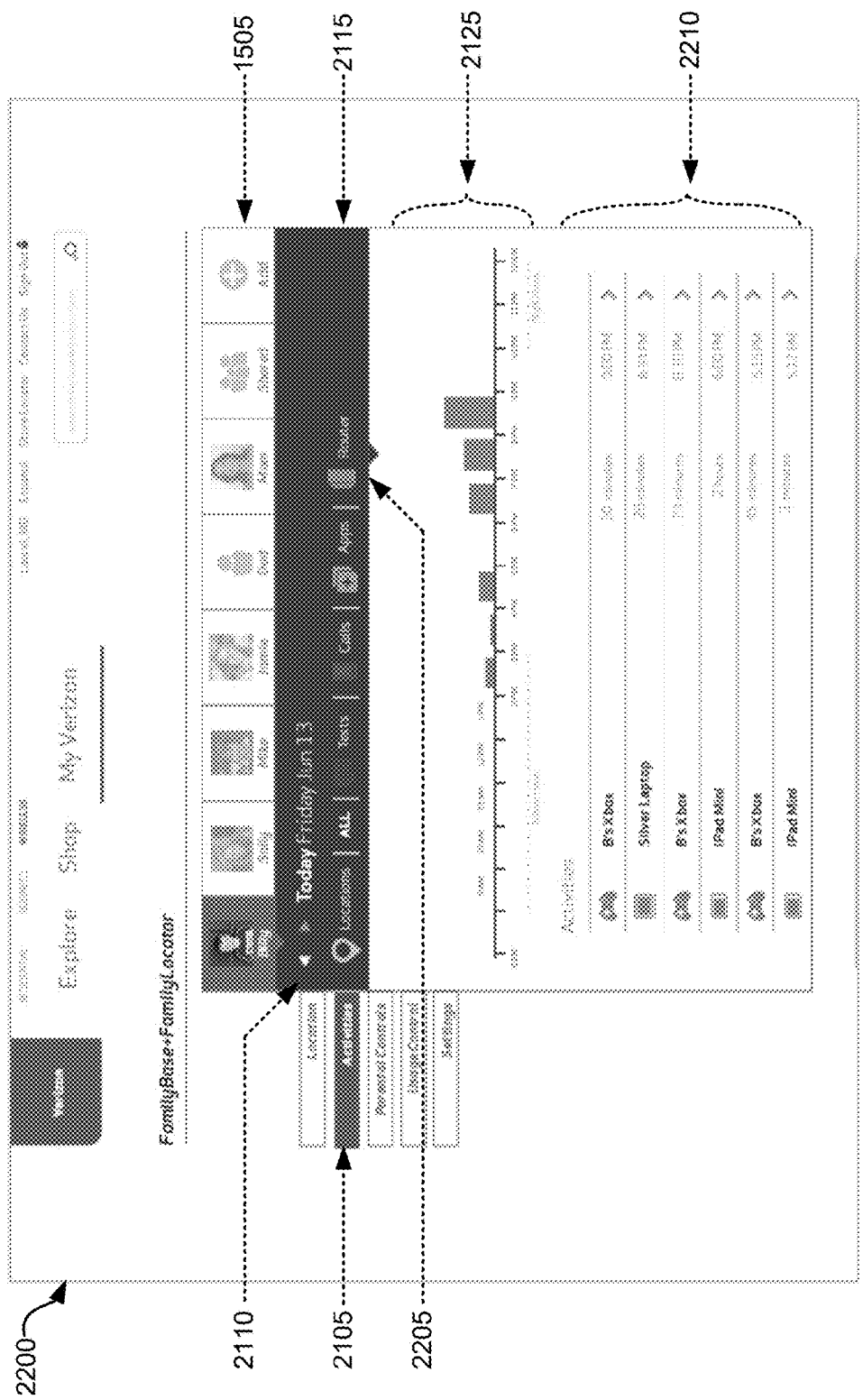

FIG. 22 depicts another exemplary UI 2200 that may be implemented within a browser of computer 125-2 for enabling account holder 100 to view the results of monitoring and analysis of a selected child and/or child device. As shown, UI 2200 may include child selection area 1505 that enables account holder 100 to select a specific child (e.g., "Billy" shown) for viewing that child's activity in multiple networks. Upon selection of the specific child, account holder 100 may select "activities" 2105 from a menu, and may select a particular time period (e.g., particular date) from time period selection area 2110 of UI 2200. Account holder 100 may further select, from a child device/activity selection area 2115 of UI 2200, a particular device or devices, and/or particular types of activity, to view the results of the monitoring and analysis. In the example of FIG. 22, account holder 100 has selected a "router" device used by "Billy" (e.g., BHR 240 of FIG. 2). UI 2200 may display usage timeline 2125 for the selected child and selected child device/activity, where usage timeline 2125 displays intervals of time (e.g., per hour) and a bar graph depiction of relative network activity for the selected device(s) or activity during each of the intervals of time. UI 2200 may further include a detailed activity section 2210 that displays a log of the activities engaged in by "Billy," via the router, using one or more devices during the selected time period. The log of activities may include, for example, an identification of the particular child device (Xbox, laptop, iPad, etc.) used by "Billy" that accessed network 115-1 via BHR 240 and WLAN 245, the time the particular device activity occurred, and a duration of time over which the particular device activity occurred.

Figure 23:
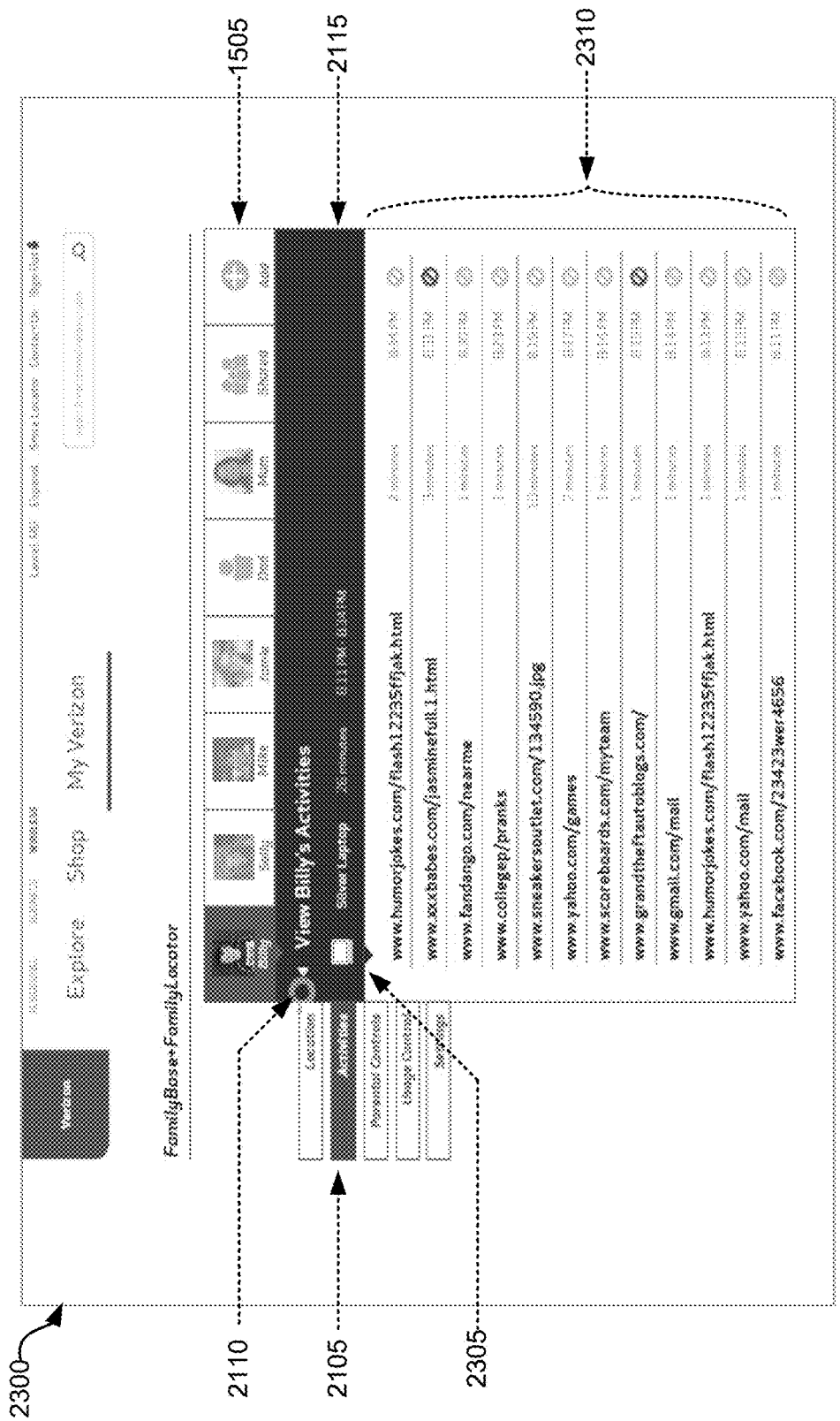

FIG. 23 depicts an additional exemplary UI 2300 that may be implemented within a browser of computer 125-2 for enabling account holder 100 to view the results of monitoring and analysis of a particular selected child device. As shown, UI 2300 may include child selection area 1505 that enables account holder 100 to select a specific child (e.g., "Billy" shown) for viewing that child's activity in multiple networks. Upon selection of the specific child, account holder 100 may select "activities" 2105 from a menu, and may select a particular time period (e.g., particular date) from time period selection area 2110 of UI 2200. As shown in FIG. 23, account holder 100 may select, from child device/activity selection area 2115 of UI 2300, a particular device used by "Billy" to view the results of the monitoring and analysis. In the example of FIG. 23, account holder 100 has selected a "silver laptop" device 2305 used by "Billy." UI 2300 may display a detailed activity section 2310 that displays a log of the activities engaged in by "Billy" using the "silver laptop." The log of activities may include, for example, an identification of all web pages visited by "Billy," a time at which the web page access occurred, and a duration of the accessing of the particular web page.

Figure 24A:
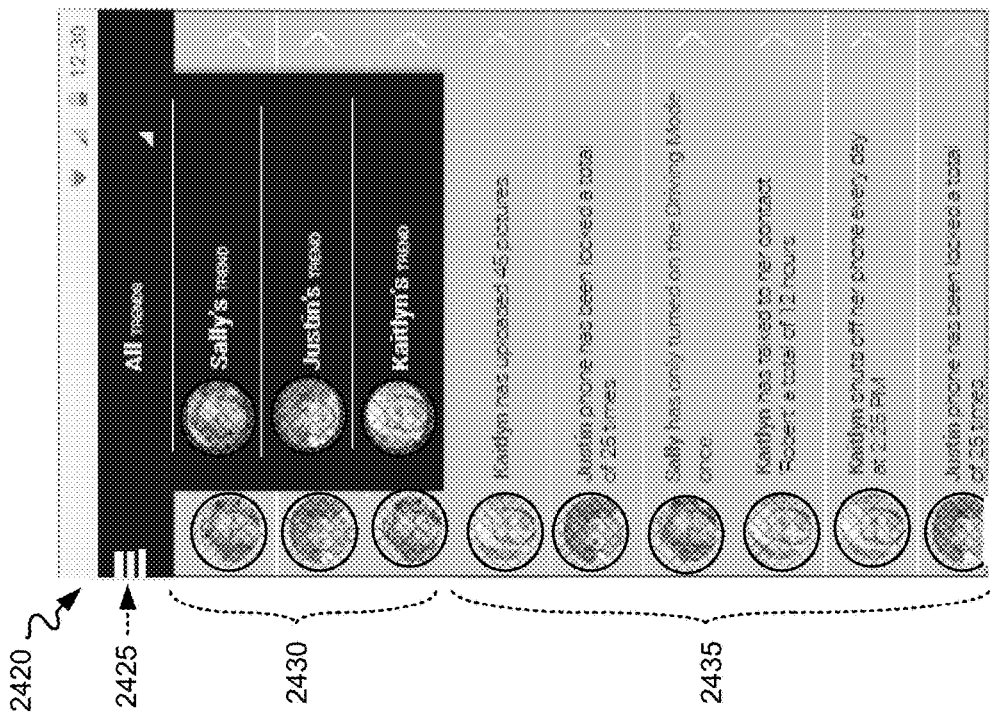

FIGS. 24A-27 further depict mobile UIs, that may be executed at phone 125-1 by account holder 100, for viewing results of the monitoring and analysis of activity of one or more selected children, or child devices. FIG. 24A depicts a UI 2400 that permits the selection, via activity area 2405, of the particular children whose activities are to be displayed. Activity area 2405 of mobile UI 2400 permits account holder 100 to select "all activities" for viewing the activity of all of the children, or to select individual children 2410 for viewing their specific activity. In the example of FIG. 24A, the activities associated with "Sally," "Justin," and "Kaitlyn" may be selected from selection menu 2410. FIG. 24A shows "all activities" being selected in activity area 2405, and a log of activity of all of the account holder 100's children being displayed in activity log 2415.

Figure 24B:
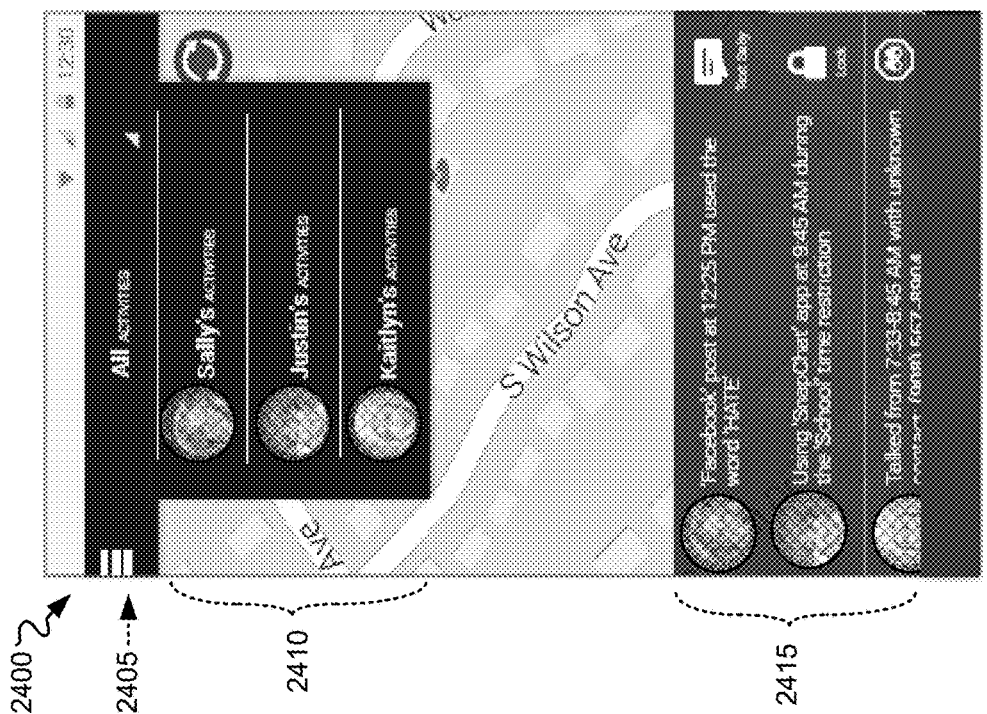

FIG. 24B further depicts a UI 2420 that permits the selection, via trend selection area 2425, of the particular child or children whose activities are to be analyzed for trends. Trend selection area 2425 of mobile UI 2420 permits account holder 100 to select "all trends" for viewing a trend analysis of all of the children, or to select individual children 2430 for viewing a trend analysis associated with each child's individual activity. FIG. 24B shows trends 2435 in child activity being displayed. The trends that are analyzed may include, for example, how many pictures a child has uploaded using a child device, a number of times a particular child device has been automatically or manually "locked" preventing usage, a total time a particular child has spent talking to a contact, a number of times a particular child has attempted to access a particular blocked website, an amount of time a particular child has used a particular app, etc. Other types of trends may be analyzed for display via UI 2420.

Figures 25A, 25B:
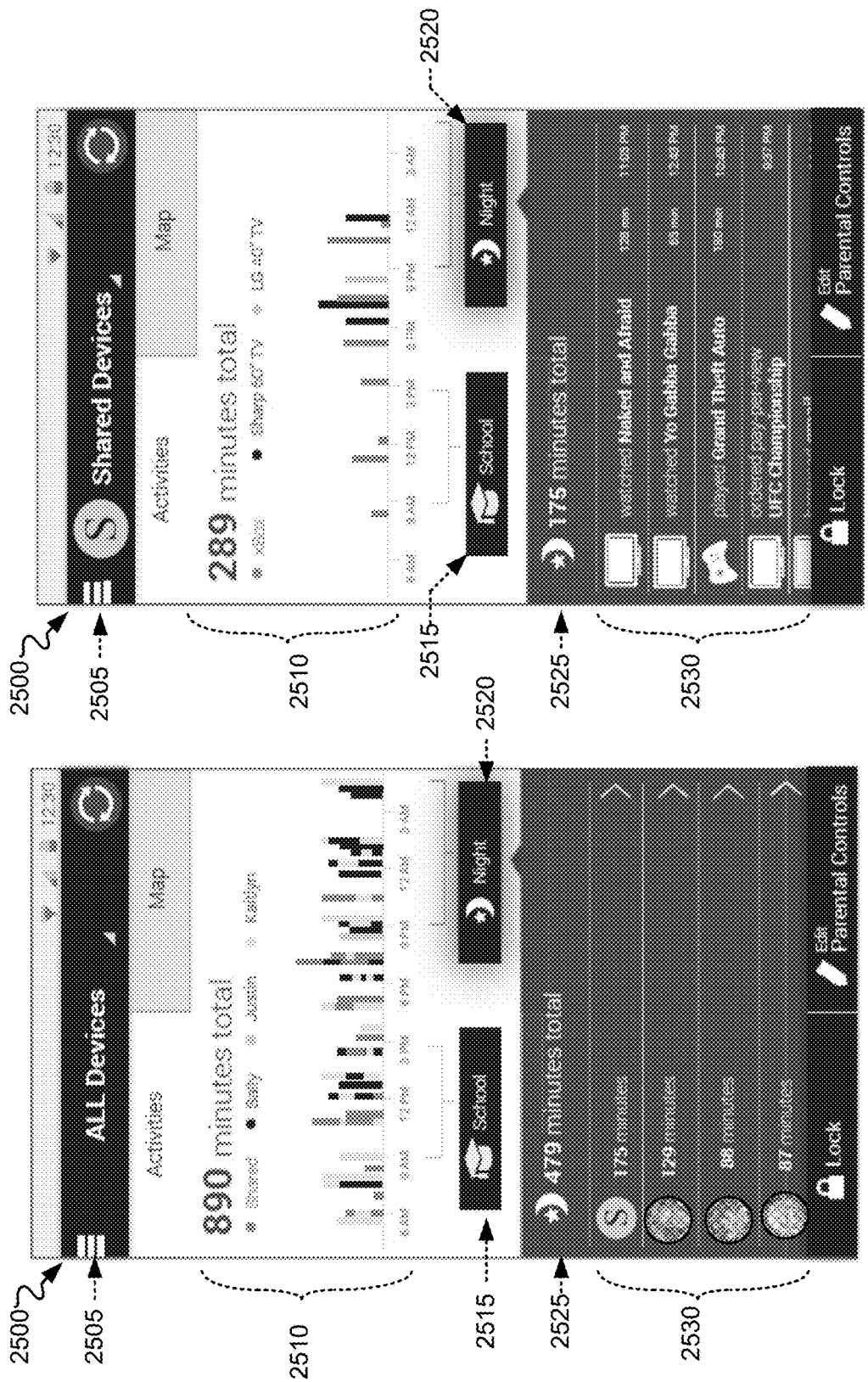

FIGS. 25A and 25B depict two examples of a UI 2500 that permits the selection, via a device selection area 2505, of one or more child devices whose activity is to be displayed. FIG. 25A depicts an example of a selection of "all devices"

such that the activity of all child devices is totaled and displayed. FIG. 25B depicts an example of a selection of "shared devices" such that the activity of one or more child devices that are shared/commonly used by the children (e.g., STB and TV, family Xbox, etc.). As shown in FIG. 25A, a total time usage 2510 for all child devices is displayed, where the total time usage 2510 includes a time summary (890 minutes total shown in the example) and a usage time line that includes a bar graph of total time usage over intervals of time (e.g., per hour). UI 2500 further enables account holder 100 to select time periods during the day, such as "school" 2515 and "night" 2520. The example of FIG. 25A shows "night" 2520 being selected, and the total time usage 2525 for the "night" being displayed, along with a total time usage 2530 per child.

In the example of FIG. 25B, a total time usage 2510 for all child devices that are shared/commonly used is displayed, where the total time usage 2510 includes a time summary (289 minutes total shown in the example) and a usage time line that includes a bar graph of total time usage over intervals of time (e.g., per hour). The example of FIG. 25B shows "night" 2520 being selected, and the total time usage 2525 for the "night" being displayed, along with a total time usage 2530 per shared device.

Figure 26B:
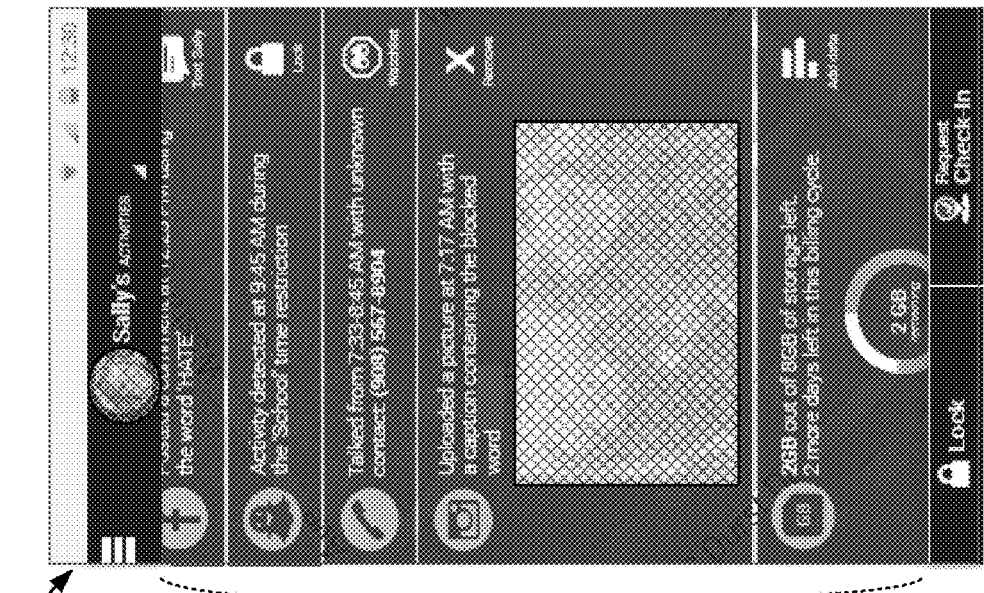
Figure 26A:
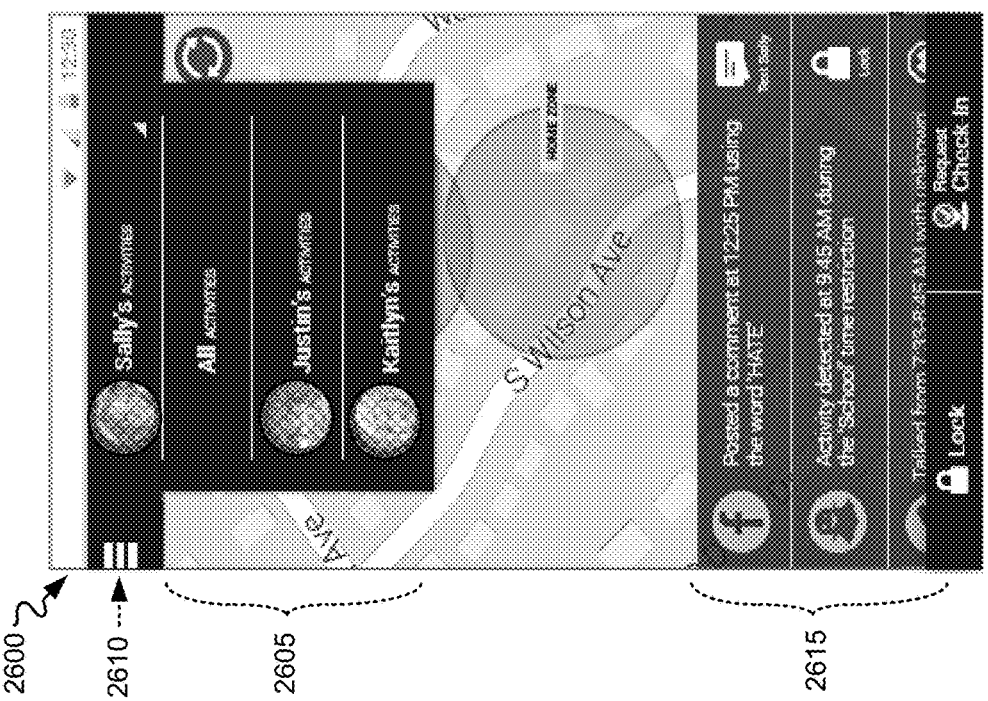

FIGS. 26A and 26B depict a UI 2600, that may be executed at phone 125-1 by account holder 100, for viewing results of the monitoring of the activity of a particular child. As shown in FIG. 26A, account holder 100 may select, via activity area 2610, the particular child whose activities are to be displayed. In the example of FIG. 26A, the activities associated with "Sally," "Justin," and/or "Kaitlyn," may be selected from selection menu 2605, with "Sally" shown as being selected. Once the child is selected via menu 2605, the network activities of that child may be displayed via a detailed activity display log 2615, as illustrated in FIG. 26B.

Figure 27:
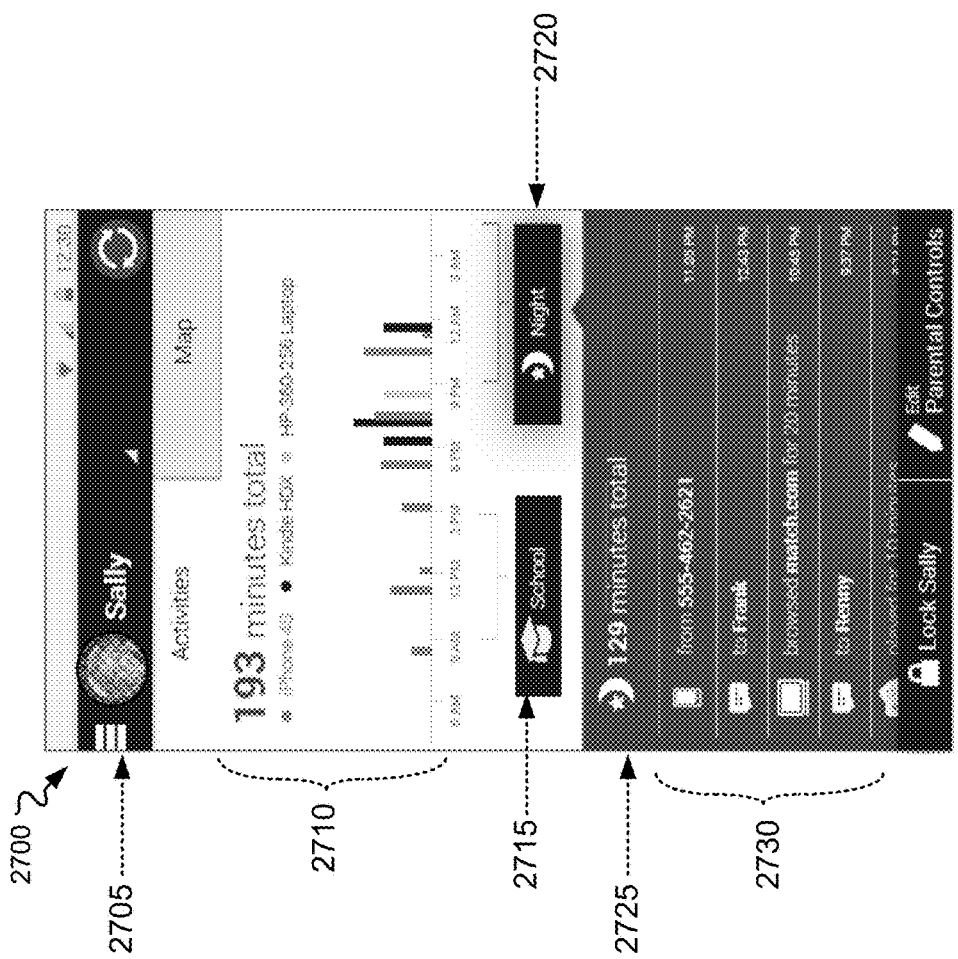
Figures 28, 29:
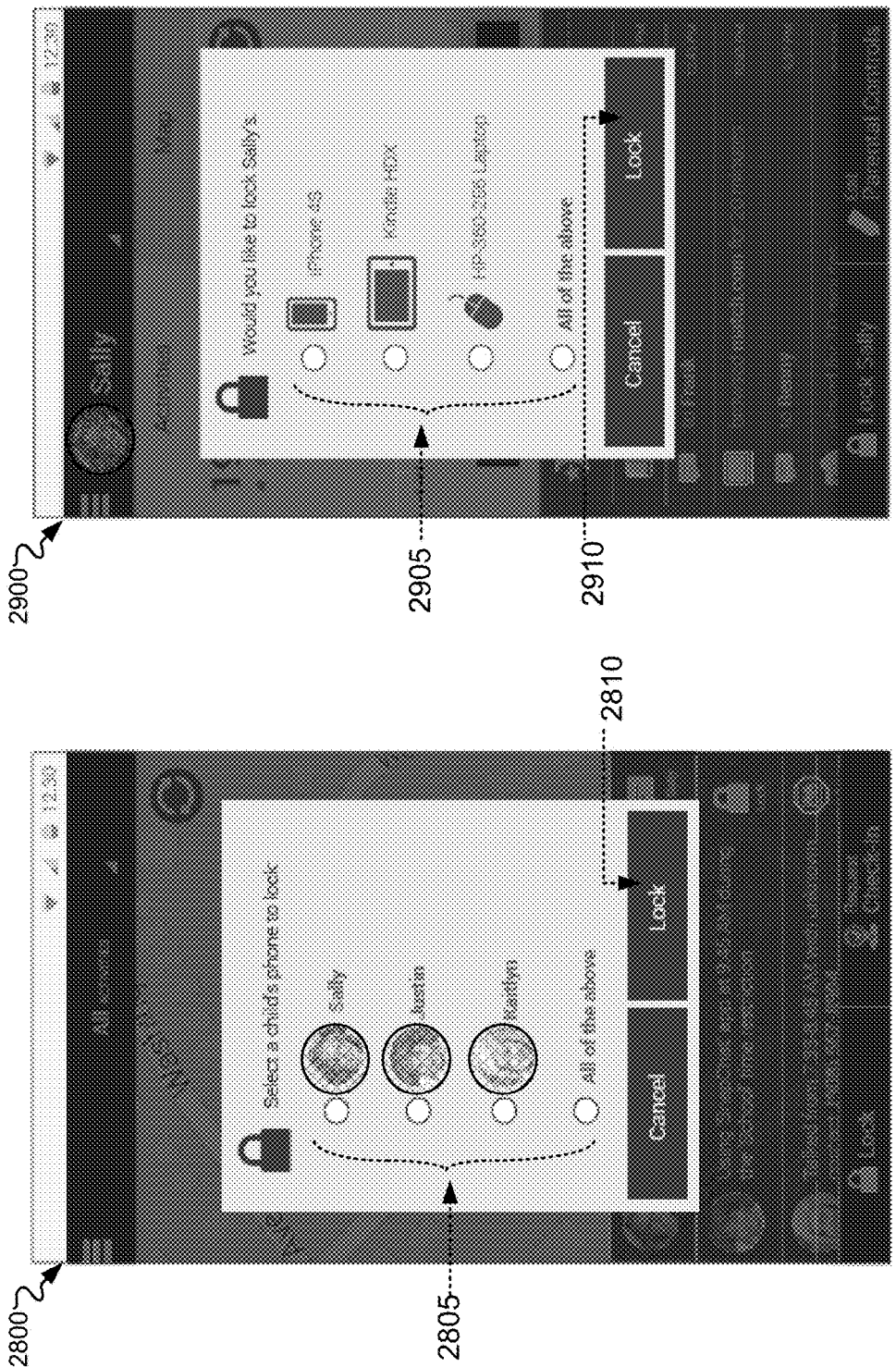

FIG. 27 depicts an example of a UI 2700, where the network activity of "Sally" 2705 has been selected for viewing. As shown in FIG. 27, a total time usage 2710 for all devices used by "Sally" is displayed, where the total time usage 2710 includes a time summary (193 minutes total shown in the example) and a usage time line that includes a bar graph of total time usage over intervals of time (e.g., per hour). UI 2700 further enables account holder 100 to select time periods during the day, such as "school" 2715 and "night" 2720. The example of FIG. 27 shows "night" 2720 being selected, and the total time usage 2725 for the "night" for all devices being used by "Sally" being displayed, along with the display of an activity log 2730 for "Sally."

CFIA platform 150 retrieves, from the account holder's profile, the customized selection of limitations, actions and restrictions to apply to children and/or child devices as specified by the account holder (block 2020). For each account, having a corresponding account holder profile 600, CFIA platform 150 locates the account holder profile 600 having data in account holder ID field 605 that matches the account holder's ID, and retrieves "actions/limitations/restrictions" stored in field 655 of an entry 610 that corresponds to the account holder's ID. CFIA platform 150 applies limitations, actions and restrictions to children and/or child devices based on account holder selections (block 2030). CFIA platform 150, possibly in conjunction with other network devices located in networks 115-1 and 115-2, applies the retrieved actions, restrictions and limitations to the device or devices of the children. The actions, limitations and/or restrictions to be applied may include device usage locks (e.g., TV viewing locks, phone usage locks, web browsing locks, etc.), On Demand restrictions or prohibitions, time of day/week restrictions on device usage, and content filtering by age group and/or category. In some implementations, the actions, limitations and/or restrictions may be applied automatically based on the conditions specified by the account holder 100. In other implementations, the actions, limitations and/or restrictions may be applied based on manual instructions received from account holder 100. For example, as shown with respect to the exemplary UIs 2800 and 2900 of FIGS. 28 and 29, account holder 100 may select from the account holder's children 2805 to "lock" 2810 a particular child's phone, or may select from a particular child's set of devices 2905 to "lock" 2910 one or more (or all) of the child's devices. "Locking" a child device may involve totally preventing the network usage of the device, or may only prevent the usage of certain functions of the device (e.g., prevent all calls and texts, except for calls/text to 911 or to home).

CFIA platform 150 retrieves, from the account holder's profile, the customized selection of the account holder's notification preferences (block 2040). For each account, having a corresponding account holder profile 600, CFIA platform 150 locates the account holder profile 600 having data in account holder ID field 605 that matches the account holder's ID, and retrieves "notification preferences" stored in field 660 of an entry 610 that corresponds to the account holder's ID.

CFIA platform 150 provides notifications to the account holder based on the notification methods and conditions specified in the account holder's notification preferences (block 2050). The notification methods used by CFIA platform 150 may include "push" type notifications, such as automated email or text notifications, or "pull" type notifications, such as via a web notification portal that account holder 100 has to log into. Account holder 100 may receive the email or text notifications via phone 125-1 and network 115-2, or may access the web notification page via phone 125-1 and network 115-2, or via computer 125-2 and network 115-1. Various different notification conditions (described above) may be specified by account holder 100 for causing account holder 100 to be notified of the occurrence of some network activity-related event. For example, notifications may occur when activity is taking place during restricted hours, when a new network device is added or detected, when a child accesses, visits or downloads certain content, or when a child attempts to access blocked, or flagged inappropriate, content. Other types of conditions may be applied to the monitored network activity of block 2010 to determine whether a certain notification method may be used to contact account holder 100.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 7, 10 and 20, the order of the blocks may be varied in other implementations. Moreover, non-dependent blocks may be performed in parallel. Implementations have been described herein with CFIA platform 150 monitoring and analyzing network activity by child and/or child's device per multiple different networks, where limitations, actions or restrictions are applied per each of the multiple different networks, possibly based on the monitored and analyzed network activity within each respective one of the multiple different networks. In other implementations, however, monitored and analyzed network activity, specified by an account holder, of a child or child device(s) in a first one of multiple different networks may be used as a basis for applying limitations, actions and/or restrictions, specified by the account holder, to the child or other child device(s) in a second one of the multiple different networks. For example, if a child tries to watch TV during a proscribed period, CFIA platform 150 may, based on account holder instructions, cause a blockage of Internet access, mobile device texting (e.g., SMS texting), email, and/or calling on a specified mobile device or devices (except for calling certain numbers such as, for example, home or 911).

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

providing, by a network device and to a device associated with an account holder, a list of activities to monitor to allow the account holder to choose particular activities from the list of activities;

providing, by the network device and to the device associated with the account holder, a list of actions, limitations, or restrictions to allow the account holder to choose particular actions, limitations, or restrictions to apply based on monitoring the particular activities;

providing, by the network device and to the device associated with the account holder, a list of types of notification to allow the account holder to choose how to be notified of the particular activities;

receiving, at the network device from the account holder and based on receiving the list of activities to monitor, a first customized selection of multiple different first types of network activity to monitor for activities performed by each first device of one or more first devices via a first network;

receiving, at the network device from the account holder and based on receiving the list of activities to monitor, a second customized selection of multiple different second types of network activity to monitor for activities performed by each second device of one or more second devices via a second network, wherein the second network is a different network than the first network;

receiving, at the network device from the account holder, a selection of one or more actions, limitations, or restrictions from the list of actions, limitations, or restrictions to apply based on monitoring the multiple different first types of network activity and the multiple different second types of network activity;

receiving, at the network device and from the account holder, a selection of one or more types of notification from the list of types of notification;

monitoring, at the network device, the multiple first types of network activity in the first network;

monitoring, at the network device, the multiple second types of network activity in the second network;

determining, from a profile associated with the account holder, an action to apply to one of the first devices, of the one or more first devices, or one of the second devices, of the one or more second devices, based on monitoring the multiple first types of network activity and the multiple second types of network activity, wherein the profile associated with the account holder stores:

an identifier associated with the account holder, a first identifier associated with a first user associated with the account holder, first device identifiers of the one or more first devices, wherein the one or more first devices are associated with the first user, a first indication that the one or more first devices connect to the first network and that the first network should be monitored for activities performed by the one or more first devices, indications of the multiple first types of network activity to monitor on the first network for activities performed by the one or more first devices, first actions to apply to each first device based on the multiple first types of network activity, wherein the first actions include locking each first device to prevent usage of each first device, a second identifier associated with a second user associated with the account holder, second device identifiers of the one or more second devices, wherein the one or more second devices are associated with the second user, a second indication that the one or more second devices connect to the second network and that the second network should be monitored for activities performed by the one or more second devices, indications of the multiple second types of network activity to monitor on the second network for activities performed by the one or more second devices, and second actions to apply to each second device based on the multiple second types of network activity, wherein the second actions include locking each second device to prevent usage of each second device; and performing, based on determining the action, at least one of:
  a) notifying, based on the selection of the one or more types of notification, the account holder of one of the multiple first types of network activity by the one of the first devices in the first network, or
  b) applying, based on the selection of the one or more actions, limitations or restrictions, an action, limitation, or restriction to the one of the second devices in the second network based on the monitoring of the multiple second types of network activity.

2. The method of claim 1, further comprising:
performing at least one of:
  a) notifying the account holder of one of the multiple second types of network activity by the one of the second devices in the second network, or
  b) applying an action, limitation, or restriction to the one of the first devices in the first network based on the monitoring of the multiple first types of network activity.

3. The method of claim 1, further comprising:
receiving, at the network device from the account holder, an identification of a first family member of the account holder; and
receiving, at the network device from the account holder, an identification of the one of the first devices as being associated with the first family member, wherein the first family member is a user of the first devices.

4. The method of claim 3, further comprising:
receiving, at the network device from the account holder, an identification of a second family member of the account holder; and
receiving, at the network device from the account holder, an identification of the one of the second devices as being associated with the second family member, wherein the second family member is a user of the second devices.

5. The method of claim 1, wherein the first network comprises an optical fiber network and wherein the second network comprises a cellular network.

6. The method of claim 1, wherein the performing comprises performing both of:
  a) notifying the account holder of one of the multiple first types of network activity by the one of the first devices in the first network, and
  b) applying an action, limitation, or restriction to the one of the second devices in the second network based on the monitoring of the multiple second types of network activity.

7. The method of claim 2, further comprising:
  a) notifying the account holder of one of the multiple second types of network activity by the one of the second devices in the second network, and
  b) applying an action, limitation, or restriction to the one of the first devices in the first network based on the monitoring of the multiple first types of network activity.

8. The method of claim 3, wherein the multiple first types of network activity comprise at least two of the following:
  a) time or data usage per device of the first devices,
  b) time or data usage of the first family member,
  c) sites visited by the first family member,
  d) applications accessed by the first family member,
  e) content or television programming accessed by the first family member, or
  f) attempts by the first family member to access blocked or flagged websites.

9. The method of claim 8, wherein the time or data usage per device of the first devices comprises a data or time usage total per device for a certain period of time, and wherein the time or data usage of the first family member comprises a data or time usage total for the first family member for the certain period of time.

10. The method of claim 1, wherein applying the action, limitation, or restriction comprises at least one of:
locking the one of the second devices to prevent device usage,
applying a time of day or week usage restriction,
applying content filtering by age, group, or category,
applying network connectivity restrictions,
applying texting restrictions, or
applying call restrictions.

11. A system, comprising:
one or more network devices comprising:
  a communication interface configured to:
    provide, to a device associated with an account holder, a list of activities to monitor to allow the account holder to choose particular activities from the list of activities,
    provide, to the device associated with the account holder, a list of actions, limitations, or restrictions to allow the account holder to choose particular actions, limitations, or restrictions to apply based on monitoring the particular activities,
    provide, to the device associated with the account holder, a list of types of notification to allow the account holder to choose how to be notified of the particular activities,
    receive, from the account holder, an indication of one or more activities to monitor, from the list of activities to monitor,
    receive, from an account holder, a first customized selection of one or more first actions, limitations, or restrictions, from the list of actions, limitations or restrictions, to apply to each first device of at least one first device connected to a first network, wherein the one or more first actions, limitations, or restrictions comprise a first subset of actions, limitations, or restrictions selected by the account holder from a set of actions, limitations, or restrictions, wherein the one or more first actions, limitations, or restrictions include locking each first device to prevent usage of each first device,
    receive, from the account holder, a second customized selection of one or more second actions, limitations, or restrictions, from the list of actions, limitations or restrictions, to apply to each second device of at least one second device connected to a second network, wherein the one or more second actions, limitations, or restrictions comprise a second subset of actions, limitations, or restrictions selected by the account holder from the set of actions, limitations, or restrictions, wherein the one or more second actions, limitations, or restrictions include locking each second device to prevent usage of each second device,
    receive, from the account holder, an indication of one or more types of notification from the list of types of notification;
    store, for each first device and in a profile associated with the account holder, an indication that the first device is connected to the first network and that the first network should be monitored for the one or more activities performed by the first device and an indication of the first customized selection of the one or more first actions, limitations, or restrictions corresponding to the first device, and
store, for each second device and in the profile, an indication that the second device is connected to the second network and that the second network should be monitored for the one or more activities performed by the second device and an indication of the second customized selection of the one or more second actions, limitations, or restrictions corresponding to the second device; and
a processing unit configured to:
monitor multiple first types of network activity engaged in by the at least one first device in the first network,
monitor multiple second types of network activity engaged in by the at least one second device in the second network,
determine, from the profile associated with the account holder, at least one of the one or more first actions, limitations, or restrictions to be applied to the at least one first device based on the monitoring of the multiple first types of network activity,
determine, from the profile associated with the account holder, at least one of the one or more second actions, limitations, or restrictions to be applied to the at least one second device based on the monitoring of the multiple second types of network activity,
cause the determined at least one of the one or more first actions, limitations, or restrictions to be applied to the at least one first device, and
cause the determined at least one of the one or more second actions, limitations, or restrictions to be applied to the at least one second device.

12. The system of claim 11, wherein the at least one first device comprises multiple first devices that are associated with, and used by, a first member of the account holder's family and wherein the at least one second device comprises multiple second devices that are associated with, and used by, a second member of the account holder's family.

13. The system of claim 12, wherein the multiple first types of network activity comprise at least two of the following:
a) time or data usage per device of the at least one first device,
b) time or data usage of the first family member,
c) sites visited by the first family member,
d) applications accessed by the first family member,
e) content or television programming accessed by the first family member, or
f) attempts by the first family member to access blocked or flagged websites.

14. The system of claim 11, wherein the first network comprises a fiber optic network and wherein the second network comprises a cellular network.

15. The system of claim 11, wherein the first customized selection of the one or more actions, limitations, or restrictions include one or more of the following:
locking the one of the second devices to prevent device usage,
applying a time of day or week usage restriction,
applying content filtering by age, group or category,
applying network connectivity restrictions,
applying texting restrictions, or
applying call restrictions.

16. A non-transitory computer-readable medium containing instructions executable by at least one processor, the computer-readable medium comprising instructions for:
providing, to a device associated with an account holder, a list of activities to monitor to allow the account holder to choose particular activities from the list of activities;
providing, to the device associated with the account holder, a list of actions to allow the account holder to choose particular actions to apply based on monitoring the particular activities;
providing, to the device associated with the account holder, a list of notification methods to allow the account holder to choose how to be notified of the particular activities;
receiving, from the account holder, an indication of one or more activities to monitor, from the list of activities to monitor;
receiving, from the account holder, an indication of one or more actions from the list of actions to apply based on monitoring the one or more activities;
receiving, from an account holder, a customized selection of notification methods, from the list of notification methods, and notification conditions associated with notifying an account holder about a first family member's network activity, wherein the first family member's network activity includes a first device's activity in a first network and a second device's activity in a second network, and wherein the second network is a different network than the first network;
monitoring multiple first types of network activity of the first device in the first network, wherein the multiple first types of network activity include the one or more activities;
monitoring multiple second types of network activity of the second device in the second network, wherein the multiple second types of network activity include the one or more activities;
determining, from a profile associated with the account holder, an action of the one or more actions to apply to the first device or the second device based on monitoring the multiple first types of network activity and the multiple second types of network activity, wherein the profile associated with the account holder stores:
an identifier associated with the account holder,
a first identifier associated with a first user associated with the account holder,
a first device identifier of the first device, wherein the first device is associated with the first user,
an indication that the first device connects to the first network and that the first network should be monitored for activities performed by the first device,
a second device identifier of the second device, wherein the second device is associated with the second user,
an indication that the second device connects to the second network and that the second network should be monitored for activities performed by the second device, and
the customized selection of notification methods and notification conditions and actions to apply to the first device and the second device based on the multiple first types of network activity and the multiple second types of network activity, wherein the actions to apply to the first device and the second device include locking the first device or the second device to prevent usage of the first device or the second device; and providing notifications to the account holder based on determining the action and based on the customized selection of notification methods and notification conditions.

17. The non-transitory computer-readable medium of claim 16, wherein the first network comprises a fiber optic network and wherein the second network comprises a cellular network.

18. The non-transitory computer-readable medium of claim 16, wherein receiving the customized selection of notification methods and notification conditions includes:

receiving, from the account holder, a first customized selection of notification methods and notification conditions associated with notifying the account holder about the first device's activity in the first network; and receiving, from the account holder, a second customized selection of notification methods and notification conditions associated with notifying the account holder about the second device's activity in the second network, wherein the first customized selection of notification methods and notification conditions is different from the second customized selection of notification methods and notification conditions, and wherein providing notifications to the account holder is further based on the first and second customized selection of notification methods and notification conditions.

19. The non-transitory computer-readable medium of claim 16, wherein the notification conditions comprise one or more of:

activity during certain hours, new network devices being added or detected, attempts to access blocked or flagged content, or exceeding time limit or data usage thresholds of network or device usage; and wherein the notification methods comprise automatic push notifications or pull notifications.

20. The non-transitory computer-readable medium of claim 19, wherein the automatic push notifications comprise email, text, or application notifications and wherein the pull notifications comprise web portal notifications.

* * * * *